US011776534B1

(12) United States Patent
Kulakarni et al.

(10) Patent No.: US 11,776,534 B1
(45) Date of Patent: Oct. 3, 2023

(54) NATURAL LANGUAGE UNDERSTANDING INTENT ADJUSTMENT

(71) Applicant: Amazon Technologies, Inc., Seattle, WA (US)

(72) Inventors: Raveendra Kulakarni, Redmond, WA (US); Shemyla Anwar, Bothell, WA (US); Rujie Yao, Bothell, WA (US); Xu Han, Seattle, WA (US); Sylvester-Jaron Dewey Ogletree, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 213 days.

(21) Appl. No.: 17/114,858

(22) Filed: Dec. 8, 2020

(51) Int. Cl.
*G10L 15/18* (2013.01)
*G06F 21/31* (2013.01)
*G10L 15/22* (2006.01)
*G10L 15/30* (2013.01)

(52) U.S. Cl.
CPC .......... *G10L 15/1815* (2013.01); *G06F 21/31* (2013.01); *G10L 15/22* (2013.01); *G10L 15/30* (2013.01)

(58) Field of Classification Search
CPC ...... G06F 3/167; G06F 16/3329; G06F 40/40; G06F 40/30; G10L 2015/223; G10L 15/26; G10L 15/00; G10L 15/22; G10L 15/18; G10L 15/30
See application file for complete search history.

(56) References Cited

U.S. PATENT DOCUMENTS

| | | | | |
|---|---|---|---|---|
| 9,990,176 | B1* | 6/2018 | Gray | G06F 16/957 |
| 9,996,531 | B1* | 6/2018 | Parastatidis | G10L 15/22 |
| 10,068,573 | B1* | 9/2018 | Aykac | G06F 3/167 |
| 10,878,479 | B2* | 12/2020 | Wu | G06F 40/35 |
| 11,308,169 | B1* | 4/2022 | Koukoumidis | G10L 15/187 |
| 2015/0382047 | A1* | 12/2015 | Van Os | H04N 21/4316 725/38 |
| 2017/0068670 | A1* | 3/2017 | Orr | G06F 40/40 |
| 2019/0236204 | A1* | 8/2019 | Canim | G10L 15/16 |
| 2019/0281341 | A1* | 9/2019 | Lawrence | H04N 21/41265 |
| 2019/0286480 | A1* | 9/2019 | Park | G06F 9/4881 |
| 2020/0027459 | A1* | 1/2020 | Chae | G06N 3/08 |
| 2021/0035561 | A1* | 2/2021 | D'Amato | G06F 3/167 |
| 2021/0366476 | A1* | 11/2021 | Smith | G10L 15/22 |
| 2021/0383800 | A1* | 12/2021 | Pair | G10L 15/22 |
| 2022/0020365 | A1* | 1/2022 | Carbune | G06F 3/165 |

* cited by examiner

Primary Examiner — Mark Villena
(74) Attorney, Agent, or Firm — PIERCE ATWOOD LLP

(57) ABSTRACT

Techniques for responding to a user input using a device-executable intent are described. A user may speak, to a device, an input corresponding to a first natural language understanding (NLU) intent executable by a speech processing system. The speech processing system may determine a device type corresponding to the device and, based on the device type, determine a data subscription is required to execute the first NLU intent. Thereafter, the speech processing system may determine a second NLU intent that is executable by the device and that results in the output of similar content to the execution of the first NLU intent. The speech processing system then directs the device to execute the second NLU intent.

20 Claims, 14 Drawing Sheets

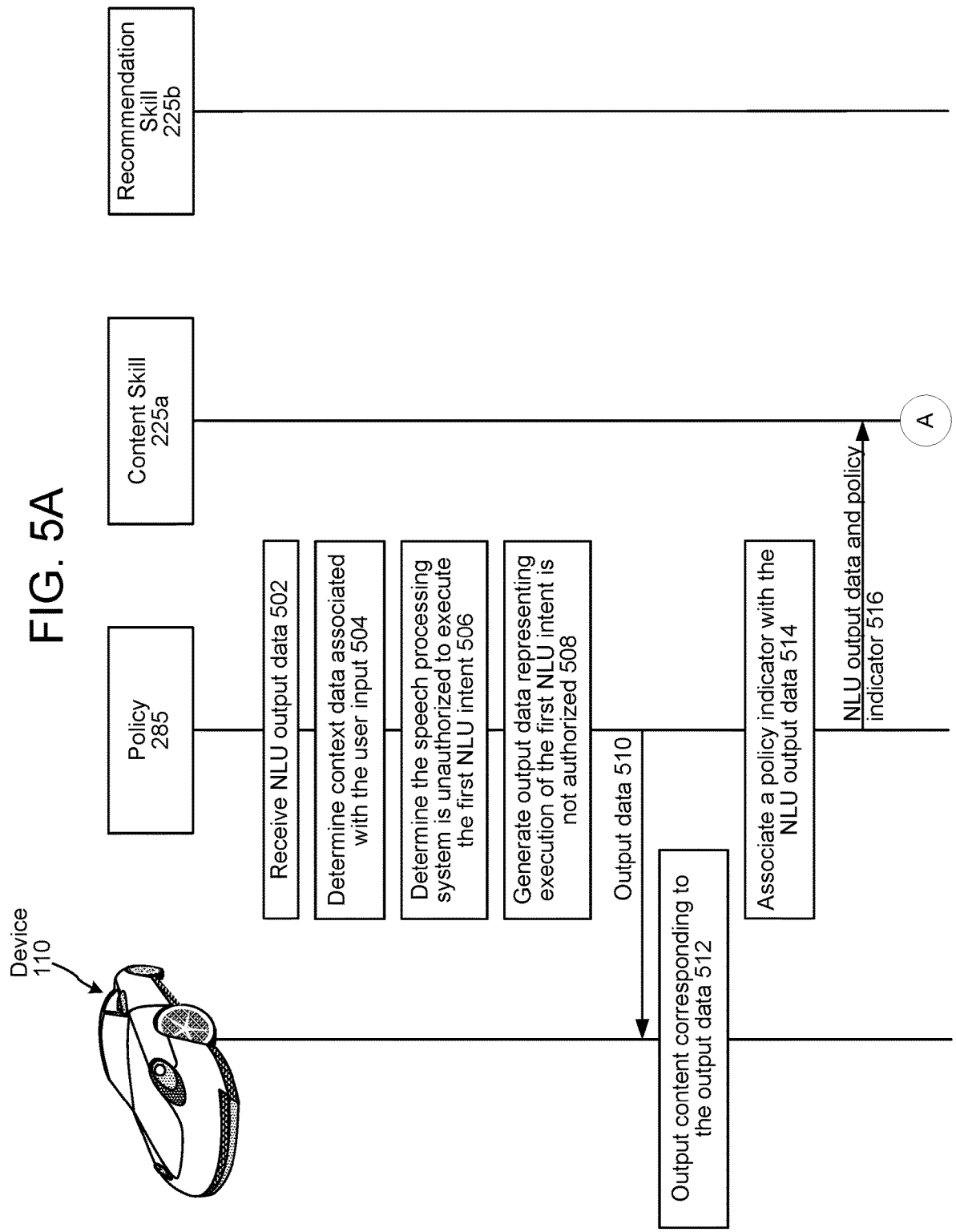

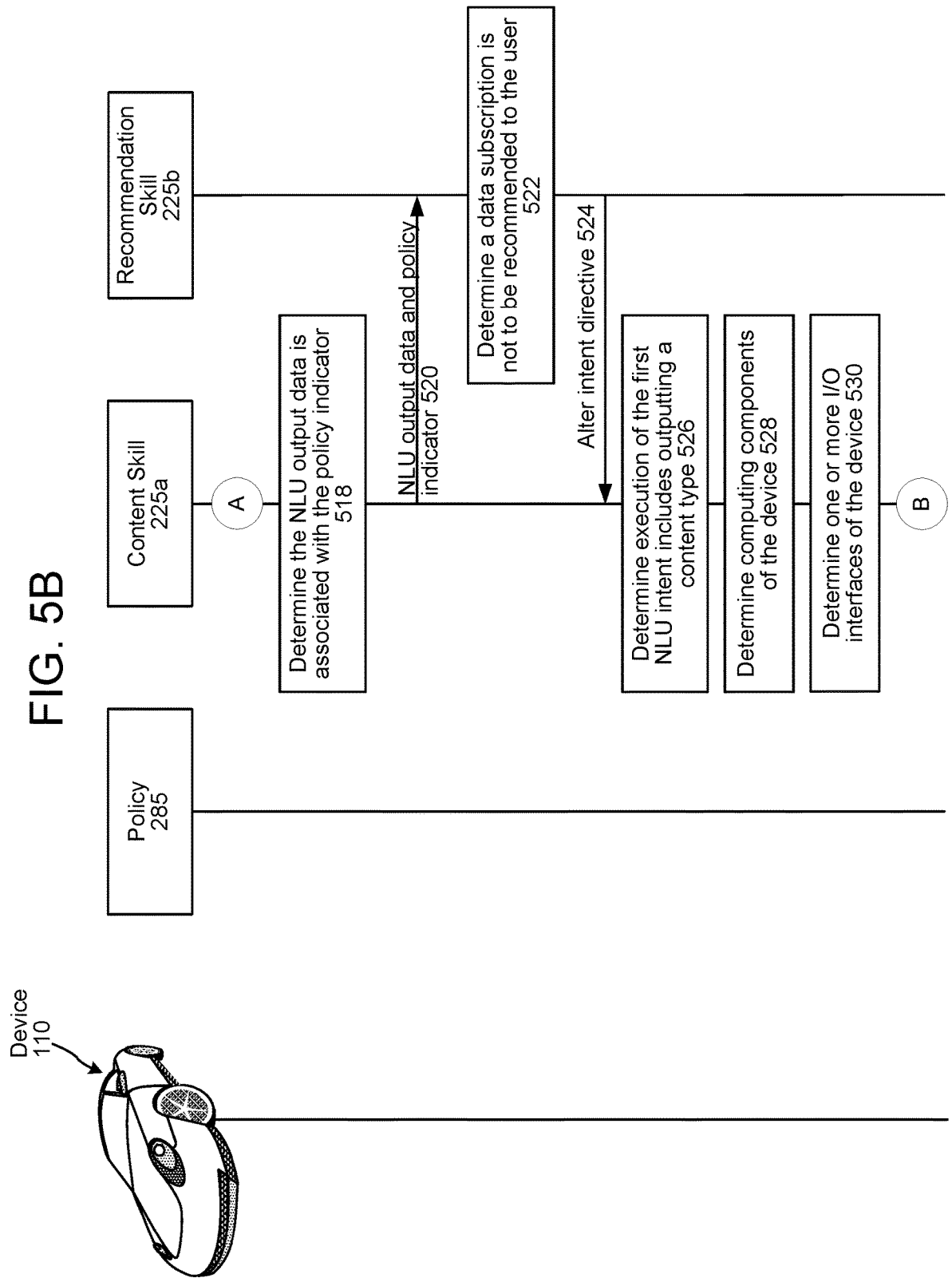

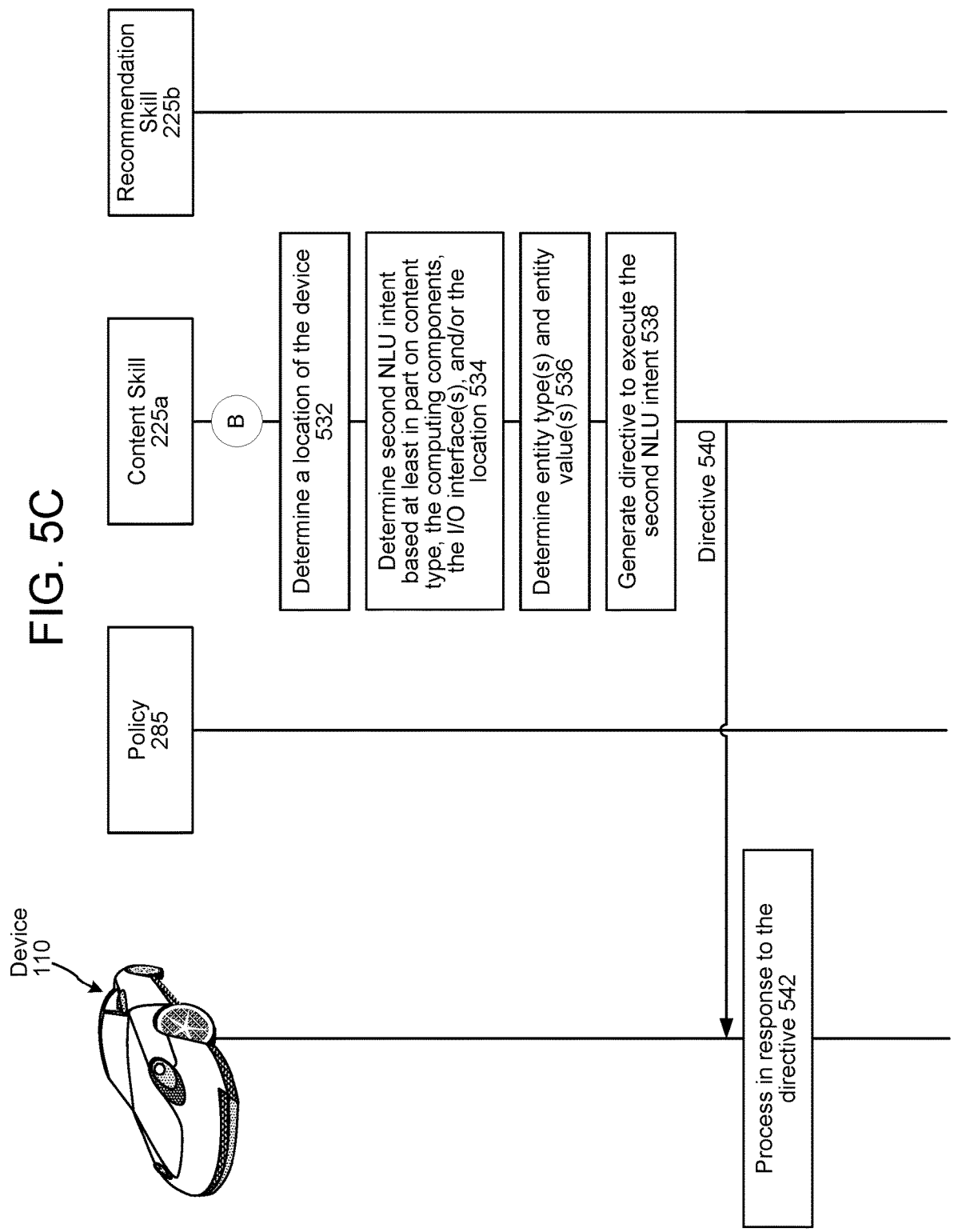

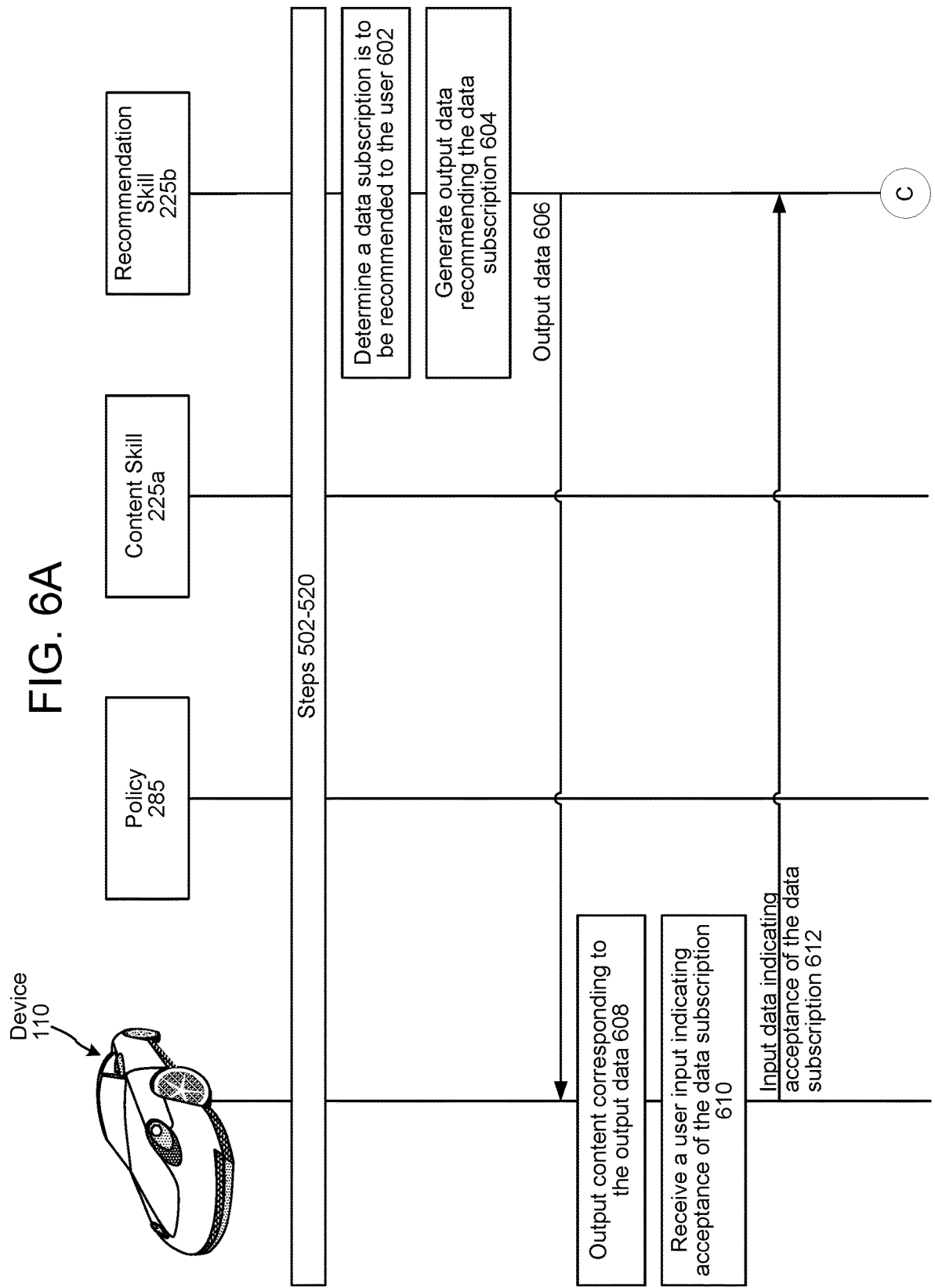

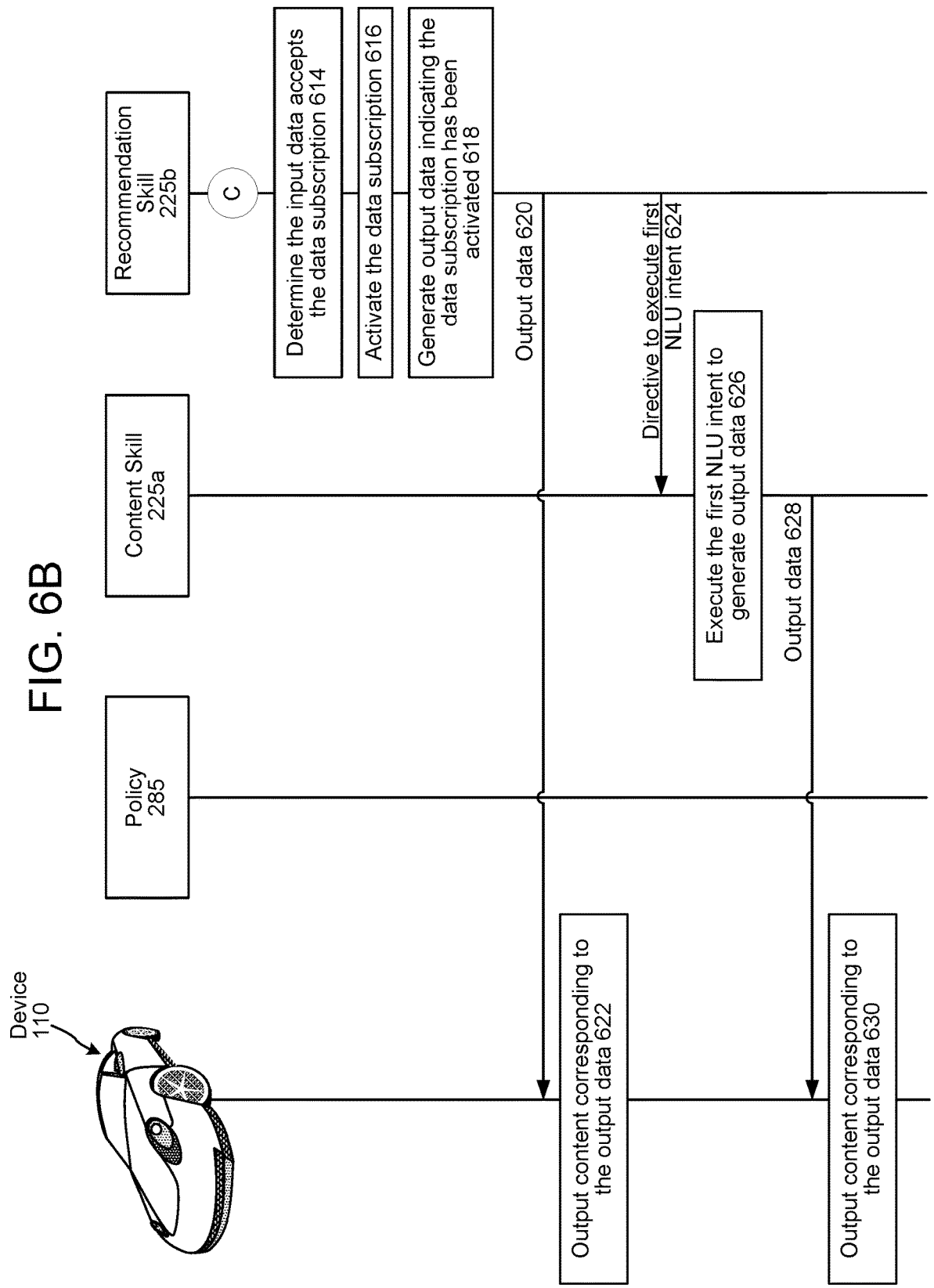

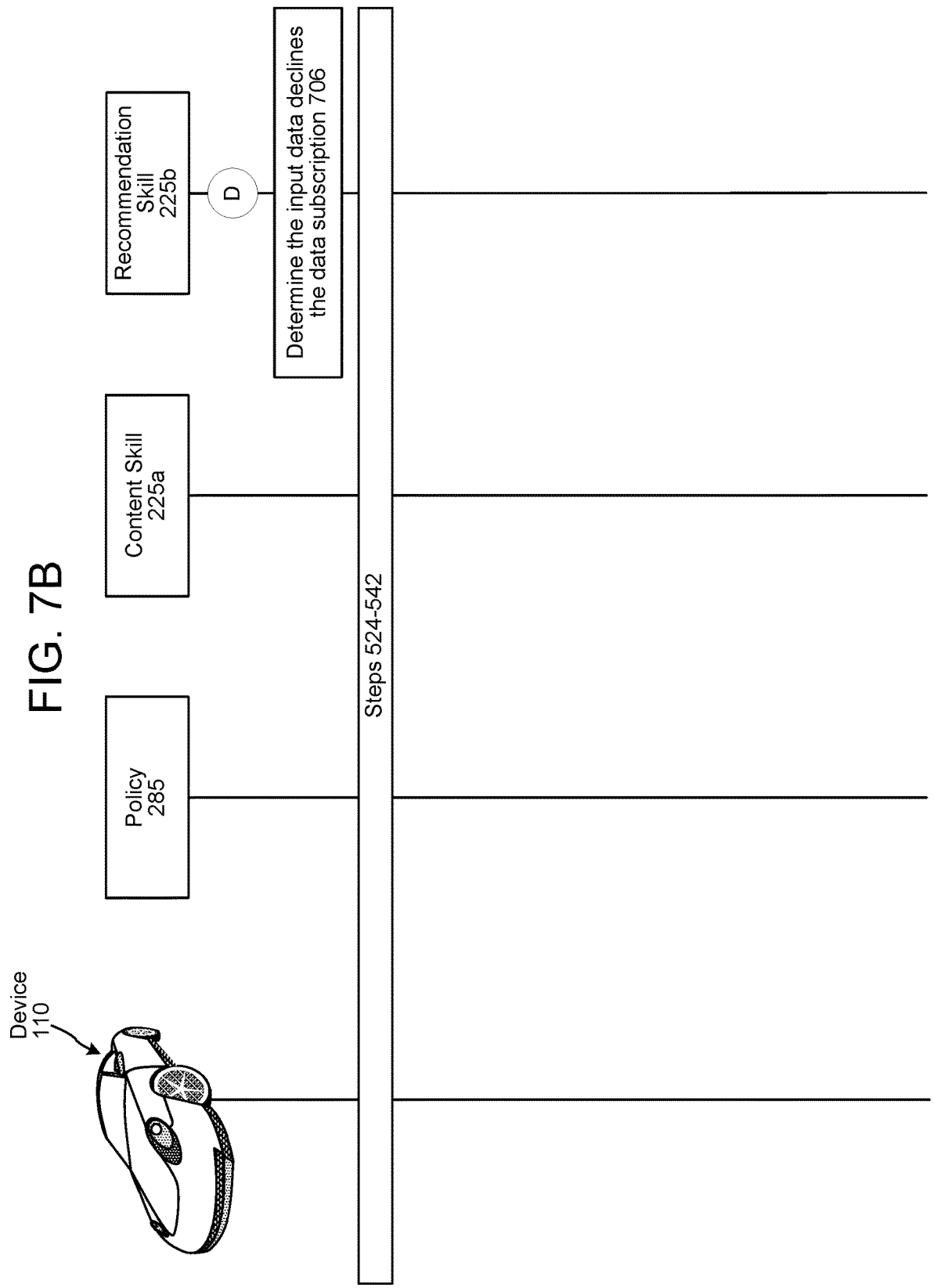

NATURAL LANGUAGE UNDERSTANDING INTENT ADJUSTMENT

BACKGROUND

Natural language processing systems have progressed to the point where humans can interact with and control computing devices using their voices. Such systems employ techniques to identify the words spoken by a user based on the various qualities of received input data. Speech recognition combined with natural language understanding processing techniques enable speech-based user control of computing devices to perform tasks based on the spoken inputs. Speech recognition and natural language understanding processing techniques are sometimes referred to collectively or separately as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 5A-5C are a signal flow diagram illustrating how a speech processing system may adjust a speech processing system-executable NLU intent, representing a user input, into a device-executable NLU intent for the purpose of responding to the user input, according to embodiments of the present disclosure.

FIGS. 6A-6B are a signal flow diagram illustrating how a speech processing system may process when a user accepts a recommended data subscription, according to embodiments of the present disclosure.

FIGS. 7A-7B are a signal flow diagram illustrating how a speech processing system may process when a user declines a recommended data subscription, according to embodiments of the present disclosure.

DETAILED DESCRIPTION

Figure 1:
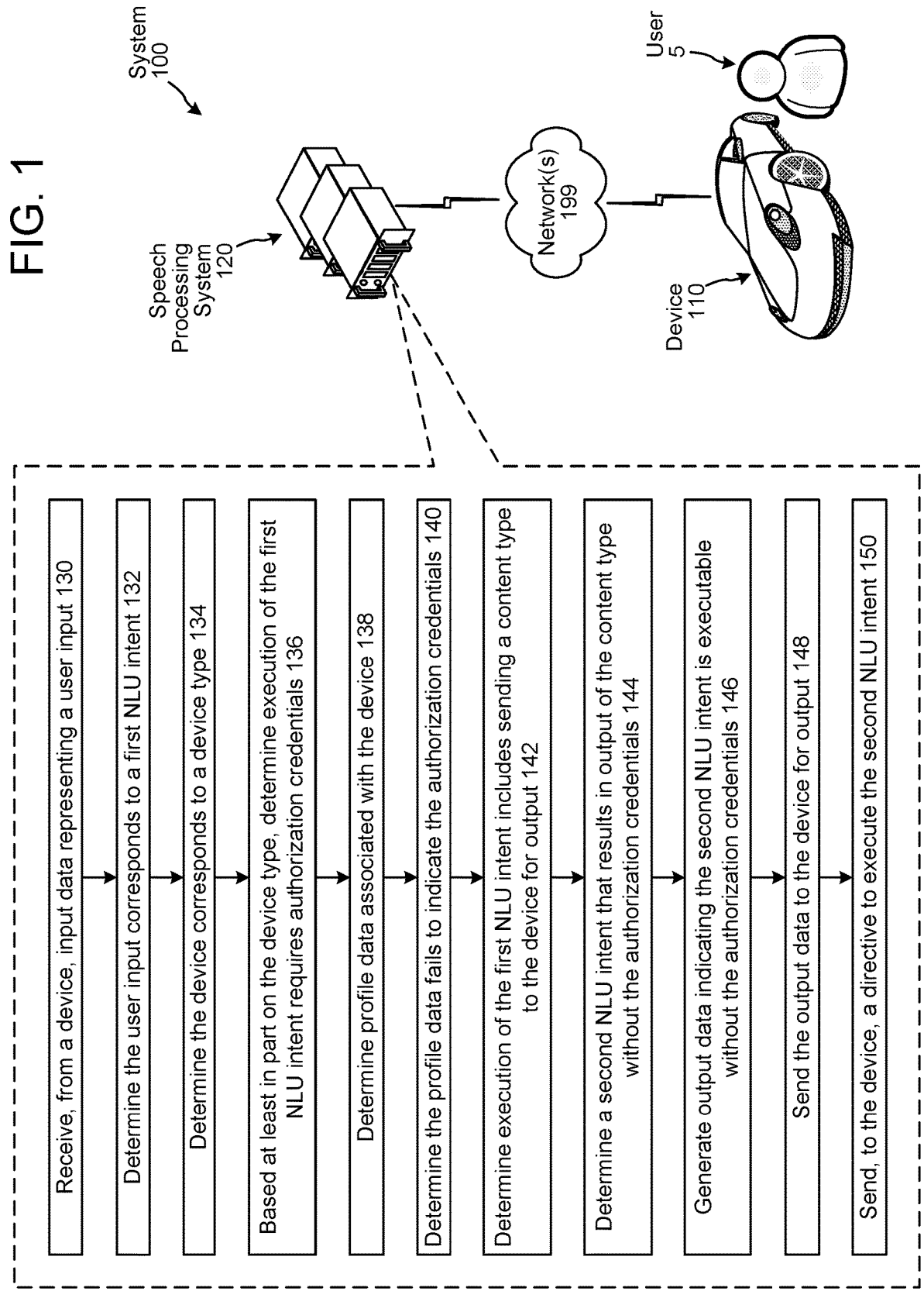
FIG. 1 is a conceptual diagram illustrating a system configured to adjust a speech processing system-executable NLU intent, representing a user input, into a device-executable NLU intent for the purpose of responding to the user input, according to embodiments of the present disclosure.

Automatic speech recognition (ASR) is a field of computer science, artificial intelligence, and linguistics concerned with transforming audio data associated with speech into a token or textual representation of that speech. Natural language understanding (NLU) is a field of computer science, artificial intelligence, and linguistics concerned with enabling computers to derive meaning from natural language user inputs (such as spoken inputs). ASR and NLU are often referred to collectively as spoken language understanding (SLU). Text-to-speech (TTS) is a field of computer science concerning transforming textual and/or other data into audio data that is synthesized to resemble human speech.

A speech processing system may be configured to perform actions responsive to spoken natural language user inputs (i.e., utterances). For example, for the spoken natural language user input "play music by [artist name]," the speech processing system may output music sung by the indicated artist. For further example, for the spoken natural language user input "turn on the lights," the speech processing system may turn on lights based on where the user is located. In another example, for the spoken natural language user input "what is today's weather," the speech processing system may output synthesized speech of weather information based on where the user is located.

A vehicle, and more particularly a vehicle's head unit, may be configured to communicate with a speech processing system for the purpose of processing spoken natural language user inputs. A vehicle's "head unit," sometimes call an infotainment system, is a component of the vehicle that provides a unified hardware interface, including screens, buttons, and controls for various integrated information and entertainment functions of the vehicle.

The speech processing system may be configured to process spoken natural language user inputs requesting performance of vehicle control functions, such as the rolling movement of windows, changing of cabin temperature, adjustment of a radio output volume, etc. The speech processing system may also be configured to process spoken natural language user inputs requesting performance of functions not unique to the vehicle. For example, a user of the vehicle (e.g., a driver or passenger) may speak "play [song title] by [artist name]," thereby requesting audio data of the song be sent from the speech processing system and to the vehicle where the song is to be played.

The foregoing may require the speech processing system send data to the vehicle. For example, after determining a spoken natural language user input requests a window of the vehicle be rolled down, the speech processing system may send a directive to the vehicle to roll down the window. For further example, after determining a spoken natural language user input asks when a next oil change for the vehicle is due, the speech processing system may send audio data, including synthesized speech indicating when the next oil change is due, to the vehicle for playback. In another example, after determining a spoken natural language user input requests the cabin temperature be set to a particular temperature, the speech processing system may send a directive to the vehicle to set the cabin temperature to the particular temperature. For further example, after determining a spoken natural language user input requests a song being played, the speech processing system may send audio data, corresponding to the song, to the vehicle for playback. In another example, after determining a spoken natural language user input requests weather information, the speech processing system may send audio data, including synthesized speech corresponding to weather information for a location of the vehicle, to the vehicle for playback.

In some situations, the sending of data between the vehicle and the speech processing system may require the user purchase a data subscription or other authorization credentials offered by a manufacturer of the vehicle, paid for by the user, and/or some arrangement involving additional/other entities. In some instances, for example, a user may be provided a trial period of a data subscription during which the user need not pay for data to be sent between the vehicle and the speech processing system. During this trial period, a profile of the user may be granted authorization credentials for the functionality being trialed. However, once the trial period expires, the user may be required to purchase a data subscription and/or otherwise have the functionality disabled.

The present disclosure provides, among other things, techniques for executing a second NLU intent, executable by a device (e.g., a vehicle or other type of speech-controllable device), when a first NLU intent, representing a received user input, is not executable by a speech processing system due to a lack of authorization (e.g., due to a user not purchasing a data subscription from a manufacturer of the device, or other entity, due to the device being a "child" device having authorization to execute a limited set of NLU intents of the speech processing system, etc.). In some instances, the user may request performance of an action that requires authorization (e.g., a data subscription) to be performed. The speech processing system of the present disclosure is configured to morph the user's request into a second request that relates to the first request but which can be executed locally by the device, thereby bypassing the authorization (e.g., data subscription) requirement with respect to the user's initial request.

According to the present disclosure, the speech processing system may determine a spoken natural language user input corresponds to a first NLU intent that is executable by the speech processing system. For example, the speech processing system may determine a spoken natural language user input corresponds to a <PlayMusic> intent, execution of which involves the speech processing system determining music and sending the music to the device for output. Rather than determining and sending the music, which may require the user purchasing a data subscription or providing some other type of pre-authorization, the speech processing system may determine a second NLU intent that is related to the first NLU intent and that is executable by the device. Continuing the foregoing example, the speech processing system may determine a <PlayRadio> intent, execution of which involves the device (e.g., a vehicle's head unit) tuning a radio to a particular station (e.g., an amplitude modulation (AM), frequency modulation (FM), or satellite station). Thus, the speech processing system may determine a second NLU intent that is capable of being executed by the device rather than the speech processing system. In some embodiments, the speech processing system may determine the second NLU intent to be a best "non-streaming" alternative to the first NLU intent. As another example, the speech processing system may determine a spoken natural language user input corresponds to a <Call> intent, execution of which involves the speech processing system performing a Voice over Internet Protocol (VoIP) call. Rather than performing the VoIP call, which may require the user purchasing a data subscription, the speech processing system may determine a second NLU intent of <PhoneCall>, execution of which involves the device (e.g., a vehicle's head unit) communicating with a smart phone of the user to perform a traditional telephone call.

Teachings of the present disclosure provide an improved user experience, among other things. For example, the present disclosure improves the user experience by permitting a user to interact with a speech processing system using a specific type of device (e.g., a vehicle) without the user being required to purchase a data subscription in order for data to be sent between the device and the speech processing system. Thus, the teachings of the present disclosure minimize or negate the situation where the speech processing system may otherwise respond with "I'm sorry, but I cannot handle that because you have not purchased a data subscription from [vehicle manufacturer or other service providing system component]."

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 shows a system 100 configured to adjust a speech processing-executable NLU intent, representing a user input, into a device-executable NLU intent for the purpose of responding to the user input. Although the figures and discussion of the present disclosure illustrate certain steps in a particular order, the steps described may be performed in a different order (as well as certain steps removed or added) without departing from the present disclosure. As shown in FIG. 1, the system 100 may include a device 110, local to a user 5, in communication with a speech processing system 120 across a network(s) 199. While illustrated as a vehicle, the device 110 is not limited thereto, but may be any type of device 110 capable of communicating with the speech processing system 120 for the purpose of responding to a user input as described herein. The network(s) 199 may include a local-area network(s) (LAN(s)), a wireless local-area network(s) (WLAN(s)), a Metropolitan Area Network(s), a Wide Area Network(s), a Campus Area Network(s), a mobile carrier system(s), and/or the like.

In some embodiments, the device 110 may send data to and receive data from a device manufacturer system associated with the device. For example, if the device 110 is a vehicle, the device manufacturer system may be a vehicle manufacturer's system. The vehicle manufacturer system may send data to and receive data from the speech processing system 120. Thus, in some embodiments, the device 110 may send data to and received data from the speech processing system 120 via a device manufacturer system.

The device 110 receives a user input from the user 5. For example, the device 110 may receive audio corresponding to a spoken natural language user input. In another example, the device 110 may receive a typed natural language user input. For further example, the device 110 may include or be in communication with a camera(s) that captures a sequence of images representing the user 5 performing a gesture (a type of user input). In another example, the device 110 may display a button and detect the user 5 interacting with the button (with the button interaction being a type of user input).

The device 110 sends (and the speech processing system 120 receives (130)) input data representing the user input. For example, the input data may be audio data when the device 110 receives a spoken natural language user input. In another example, the input data may be text data when the device 110 receives a typed natural language user input. For further example, the input data may be image data when the device 110 receives a sequence of images representing the user 5 performing a gesture. Or the device 110 may process the sequence of images to determine the gesture, and may send an indication of the gesture to the speech processing system 120. In another example, when the device 110 detects the user 5 interacting with a button, the device 110 may send input data (representing the button interaction) to the speech processing system 120.

After receiving the input data, the speech processing system 120 may determine (132) the user input corresponds to a first NLU intent. For example, if the speech processing system 120 receives audio data from the device 110, the speech processing system 120 may perform ASR processing on the audio data to generate ASR output data, and may perform NLU processing on the ASR output data to generate NLU output data including the first NLU intent. Alternatively, the speech processing system 120 may perform SLU processing on the audio data to generate the NLU output data. In another example, if the speech processing system 120 receives text data from the device 110, the speech processing system 120 may perform NLU processing on the text data to generate the NLU output data including the first NLU intent. For further example, if the speech processing system 120 receives image data from the device 110, the speech processing system 120 may perform computer vision processing on the image data to determine the user-performed gesture, and may determine the gesture corresponds to the first NLU intent. In another example, if the speech processing system 120 receives, from the device 110, data representing a performed gesture, the speech processing system 120 may determine the gesture corresponds to the first NLU intent. For further example, if the speech processing system 120 receives, from the device 110, data representing a button interaction, the speech processing system 120 may determine the button interaction corresponds to the first NLU intent.

The speech processing system 120 may also determine (134) the device 110 corresponds to a device type. Example device types include, but are not limited to, child device, guest device (e.g., a device in a guest room or hotel room vehicle, washer, dryer, refrigerator, microwave, toaster, television, and displayless (i.e., headless). As an example, the input data may include or be associated with a device identifier (e.g., a serial number) of the device 110, the speech processing system 120 may determine profile data (e.g., group profile data, user profile data, and/or device profile data) associated with the device identifier, and the speech processing system 120 may determine a device type represented in the profile data.

Based at least in part on the device type, the speech processing system 120 may determine (136) execution of the first NLU intent requires authorization credentials. For example, the speech processing system 120 may not be configured to continually send (i.e., stream) audio data (e.g., of a song, news program, podcast, etc.) to the device 110 without the user 5 having already purchased a one-time access credential, or ongoing authorization credentials in the form of a data subscription, from a manufacturer of the device 110, or some other entity. For further example, the speech processing system 120 may not be configured to continually send multimedia data (e.g., including audio and video of a music video, news program, etc.) to the device 110 without the user 5 having already purchased a one-time access credential, or ongoing authorization credentials in the form of a data subscription, from a manufacturer of the device 110, or some other entity.

In some embodiments, the speech processing system 120 may make the foregoing determination based at least in part on the first NLU intent and the device type. For example, the speech processing system 120 may determine execution of the first NLU intent requires authorization credentials when the first NLU intent is a <PlayMusic> intent and the device type is "vehicle." For further example, the speech processing system 120 may determine execution of the first NLU intent requires authorization credentials when the first NLU intent is a <PlayPodcast> intent and the device type is "vehicle." In another example, the speech processing system 120 may determine execution of the first NLU intent requires authorization credentials when the first NLU intent is a <PlayVideo> intent and the device type is "vehicle."

The speech processing system 120 may determine (138) profile data associated with the device. The speech processing system 120 may determine the profile data before or after determining execution of the first NLU intent requires authorization credentials. As an example, the input data may include or be associated with a device identifier (e.g., a serial number) of the device 110, and the speech processing system 120 may determine profile data associated with the device identifier. In some embodiments, the speech processing system 120 may perform user recognition processing to determine the profile data. For example, if the input data is audio data corresponding to a spoken natural language user input, the speech processing system 120 may perform speech-based user recognition processing on the audio data to determine a user identifier corresponding to the user 5 that spoke the spoken natural language user input, and may determine profile data associated with the user identifier.

The speech processing system 120 may determine (140) the profile data fails to indicate the authorization credentials. For example, the speech processing system 120 may process the user profile data to identify a subscriptions field, and may either determining no subscriptions field exists, or may determine the subscriptions field does not include data representing a one-time or ongoing authorization credentials has been purchased.

After determining the user profile data fails to indicate the authorization credentials, the speech processing system 120 may determine (142) execution of the first NLU intent includes sending a content type to the device 110 for output. For example, if the user input requests the output of a song, the speech processing system 120 may determine the content type to be "music." For further example, if the user input requests the output of a podcast, the speech processing system 120 may determine the content type to be "podcast." In another example, if the user input requests the output of news, the speech processing system 120 may determine the content type to be "news."

The speech processing system 120 may determine (144) a second NLU intent that results in the output of the content type without the authorization credentials. For example, if the user input requests the output of a song and the first NLU intent thus corresponds to a "music" content type, the speech processing system 120 may determine the second NLU intent as one that causes a radio station (e.g., an AM or FM radio station) to be played using a radio installed on the device 110. In the foregoing example, the second NLU intent may be <TurnOnRadio>. For further example, if the user input requests the output of a podcast and the first NLU intent thus corresponds to a "podcast" content type, the speech processing system 120 may determine the second NLU intent as one that causes the device 110 to indicate the device 110 has an input/output (I/O) interface (e.g., Bluetooth, universal serial bus (USB), etc.) to which the user 5 may connect a second device (e.g., a smart phone) for the purpose of playing a podcast. In the foregoing example, the second NLU intent may be <ActivateI/OInterface>. In another example, if the user input requests the output of news and the first NLU intent thus corresponds to a "news" content type, the speech processing system 120 may determine the second NLU intent as one that causes the device 110 to indicate the device 110 has an I/O interface to which the user 5 may connect a second device for the purpose of playing news content. In the foregoing example, the second NLU intent may be <ActivateI/OInterface>.

The speech processing system 120 may generate (146) output data indicating the second NLU intent is executable without the authorization credentials. In some embodiments, the output data may include audio data including synthesized speech indicating the second NLU intent is executable without the authorization credentials. In other embodiments, the output data may include text data including natural language text indicating the second NLU intent is executable without the authorization credentials. In yet other embodiments, the output data may include audio data, including synthesized speech indicating the second NLU intent is executable without the authorization credentials, as well as text data including natural language text indicating the second NLU intent is executable without the authorization credentials. For example, if the user input requests the playing of a song, the output data may correspond to "Streaming music is not available without a data plan. Here's a FM radio station you may like." For further example, if the user input requests the playing of a podcast, the output data may correspond to "Streaming a podcast is not available without a data plan. Consider connecting your phone to your vehicle via Bluetooth or USB to listen to a podcast."

The speech processing system 120 sends (148) the output data to the device 110 for output. For example, if the output data includes audio data including synthesized speech, the device 110 may output the synthesized speech as audio. For further example, if the output data includes text data including natural language text, the device 110 may display the natural language text. In another example, if the output data includes the foregoing audio data and text data, the device 110 may output the synthesized speech as audio and/or display the natural language text.

The speech processing system 120 may also send (150), to the device 110, a directive to execute the second NLU intent. For example, if the second NLU intent is a <PlayRadio> intent, the directive may cause the device 110 to tune a radio, installed on the device 110, to a particular AM or FM radio station. For further example, if the second NLU intent is a <ActivateI/OInterface> intent, the directive may cause the device 110 to switch a data input source, of the device 110, to a particular I/O interface (e.g., Bluetooth, USB, etc.). As such, the directive causes the device 110 to locally execute the second NLU intent, thereby circumventing the initial need of authorization credentials to respond to the user input.

Figure 2:
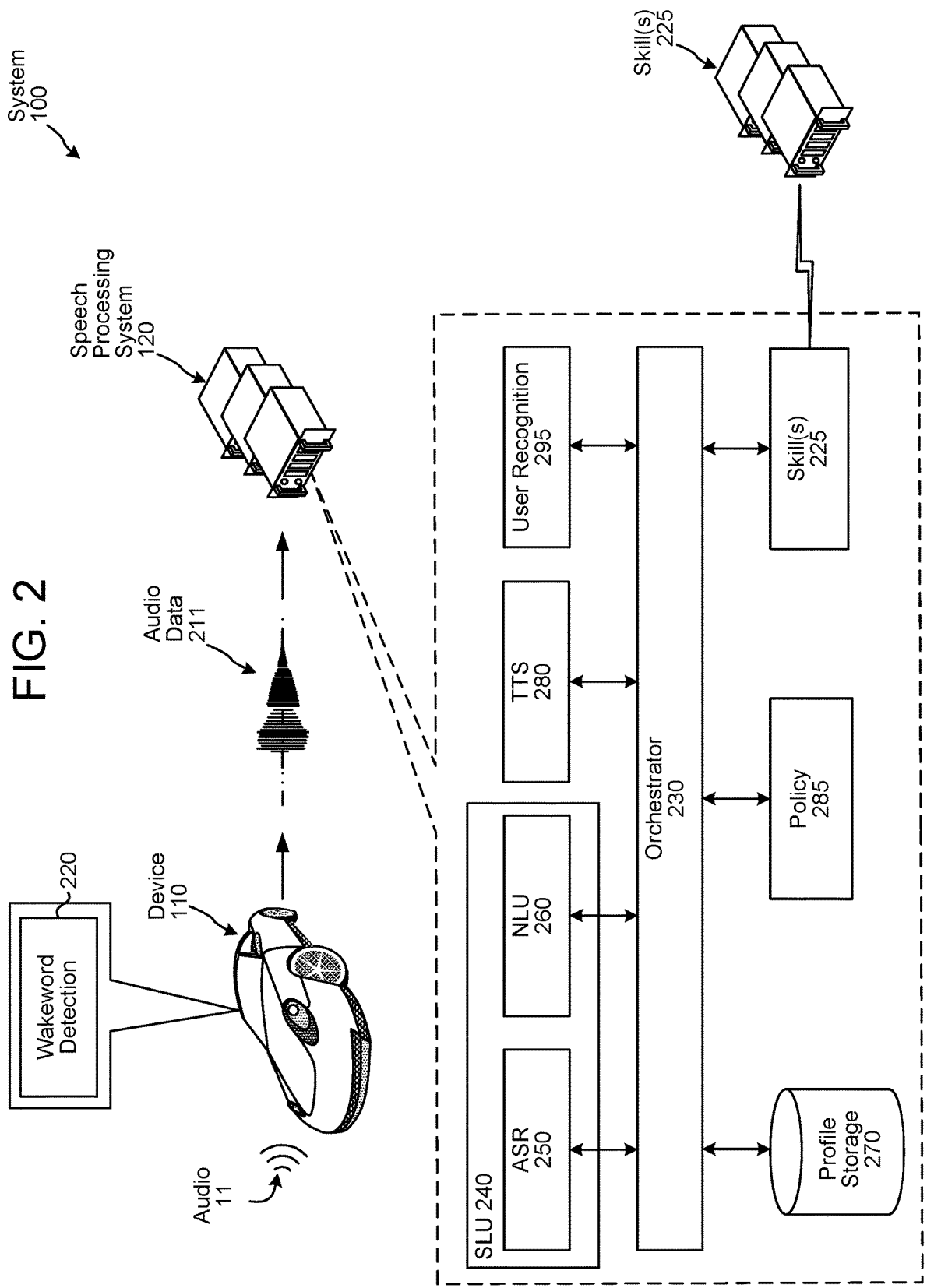
FIG. 2 is a conceptual diagram of components of the system, according to embodiments of the present disclosure.

The system 100 may operate using various components as illustrated in FIG. 2. The various components may be located on a same or different physical devices. Communication between various components may occur directly or across a network(s) 199.

A microphone or array of microphones (of or otherwise associated with the device 110) may capture audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may determine if the speech is directed at the device 110/speech processing system 120. In at least some embodiments, such determination may be made using a wakeword detection component 220. The wakeword detection component 220 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the device 110 may "wake" and begin transmitting audio data 211, representing the audio 11, to the speech processing system 120. The audio data 211 may include data corresponding to the detected wakeword, or the device 110 may remove the portion of the audio corresponding to the detected wakeword prior to sending the audio data 211 to the speech processing system 120.

The speech processing system 120 may include an orchestrator component 230 configured to, among other things, coordinate data transmissions between components of the speech processing system 120. The orchestrator component 230 may receive the audio data 211 from the device 110, and send the audio data 211 to an ASR component 250.

The ASR component 250 transcribes the audio data 211 into ASR output data including one or more ASR hypotheses. An ASR hypothesis may be configured as a textual interpretation of the speech in the audio data 211, or may be configured in another manner, such as one or more tokens. Each ASR hypothesis may represent a different likely interpretation of the speech in the audio data 211. Each ASR hypothesis may be associated with a score (e.g., confidence score, probability score, or the like) representing the associated ASR hypothesis correctly represents the speech in the audio data 211.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

In at least some instances, instead of the device 110 receiving audio 11, the device 110 may receive a typed natural language user input. The device 110 may determine text data representing the typed natural language user input, and may send the text data to the speech processing system 120, wherein the text data is received by the orchestrator component 230. The orchestrator component 230 may send the text data or ASR output data, depending on the type of natural language user input received, to a NLU component 260.

The NLU component 260 processes the ASR output data or text data to determine one or more NLU hypotheses embodied in NLU output data. The NLU component 260 may perform intent classification (IC) processing on the ASR output data or text data to determine an intent of the natural language user input. An intent corresponds to an action to be performed that is responsive to the natural language user input. To perform IC processing, the NLU component 260 may communicate with a database of words linked to intents. For example, a music intent database may link words and phrases such as "quiet," "volume off," and "mute" to a <Mute> intent. The NLU component 260 identifies intents by comparing words and phrases in ASR output data or text data to the words and phrases in an intents database. In some embodiments, the NLU component 260 may communicate with multiple intents databases, with each intents database corresponding to one or more intents associated with a particular skill.

For example, IC processing of the natural language user input "play my workout playlist" may determine an intent of <PlayMusic>. For further example, IC processing of the natural language user input "call mom" may determine an intent of <Call>. In another example, IC processing of the natural language user input "call mom using video" may determine an intent of <VideoCall>. In yet another example, IC processing of the natural language user input "what is today's weather" may determine an intent of <OutputWeather>.

The NLU component 260 may also perform named entity recognition (NER) processing on the ASR output data or text data to determine one or more portions, sometimes referred to as slots, of the natural language user input that may be needed for post-NLU processing (e.g., processing performed by a skill). For example, NER processing of the natural language user input "play [song name]" may determine an entity type of "SongName" and an entity value corresponding to the indicated song name. For further example, NER processing of the natural language user input "call mom" may determine an entity type of "Recipient" and an entity value corresponding to "mom." In another example, NER processing of the natural language user input "what is today's weather" may determine an entity type of "Date" and an entity value of "today."

In at least some embodiments, the intents identifiable by the NLU component 260 may be linked to one or more grammar frameworks with entity types to be populated with entity values. Each entity type of a grammar framework corresponds to a portion of ASR output data or text data that the NLU component 260 believes corresponds to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 260 may perform NER processing to identify words in ASR output data or text data as subject, object, verb, preposition, etc. based on grammar rules and/or models. Then, the NLU component 260 may perform IC processing using the identified verb to identify an intent. Thereafter, the NLU component 260 may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRF), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 260 may generate NLU output data including one or more NLU hypotheses, with each NLU hypothesis including an intent and optionally one or more entity types and corresponding entity values. In some embodiments, the NLU component 260 may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the speech processing system 120 may perform speech processing using two different components (e.g., the ASR component 250 and the NLU component 260). In at least some embodiments, the speech processing system 120 may implement a spoken language understanding (SLU) component 240 configured to process audio data 211 to determine NLU output data.

The SLU component 240 may be equivalent to a combination of the ASR component 250 and the NLU component 260. Yet, the SLU component 240 may process audio data 211 and determine the NLU output data without an intermediate step of generating ASR output data. As such, the SLU component 240 may take audio data 211, representing a spoken natural language user input, and attempt to make a semantic interpretation of the spoken natural language user input. That is, the SLU component 240 may determine a meaning associated with the spoken natural language user input and then implement that meaning. For example, the SLU component 240 may interpret a spoken natural language user input in order to derive a desired action. The SLU component 240 may output a most likely NLU hypothesis, or multiple NLU hypotheses associated with respective confidence or other scores (such as probability scores, etc.).

The NLU component 260, or the SLU component 240 depending on configuration of the speech processing system 120, may send the NLU output data to the orchestrator component 230. The orchestrator component 230 may send the NLU output data to a skill 225.

The speech processing system 120 may include or otherwise communicate with one or more skills 225. A "skill" may refer to software, that may be placed on a machine or a virtual machine (e.g., software that may be launched in a virtual instance when called), configured to process NLU output data and perform one or more actions in response thereto. For example, for NLU output data including a <PlayMusic> intent, an "artist" entity type, and an artist name as an entity value, a skill 225 may output music sung by the indicated artist. For further example, for NLU output data including a <TurnOn> intent, a "device" entity type, and an entity value of "lights," a skill 225 may cause one or more "smart" lights to operate in an "on" state. In another example, for NLU output data including an <OutputWeather> intent, a "location" entity type, and an entity value corresponding to a geographic location of the device 110, a skill 225 may output weather information for the geographic location. What is described herein as a skill 225 may be referred to using different terms, such as a processing component, an action, bot, application, or the like. Inputs to a skill 225 may originate from various types of user input, including but not limited to spoken natural language user inputs, typed natural language user inputs, gestures, buttons selections, etc.

A skill 225 may be associated with a domain, with each domain corresponding to a category of content. A non-limiting list of domains includes a smart home domain, a music domain, a video domain, a weather domain, a communications domain, a news domain, and a shopping domain.

The speech processing system 120 may include a TTS component 280 that generates audio data including synthesized speech. Data, input to the TTS component 280 may take various forms including, but not limited to, text data. Data, input to the TTS component 280, may come from a skill 225, the orchestrator component 230, or another component of the speech processing system 120.

The TTS component 280 may generate audio data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

Figure 3:
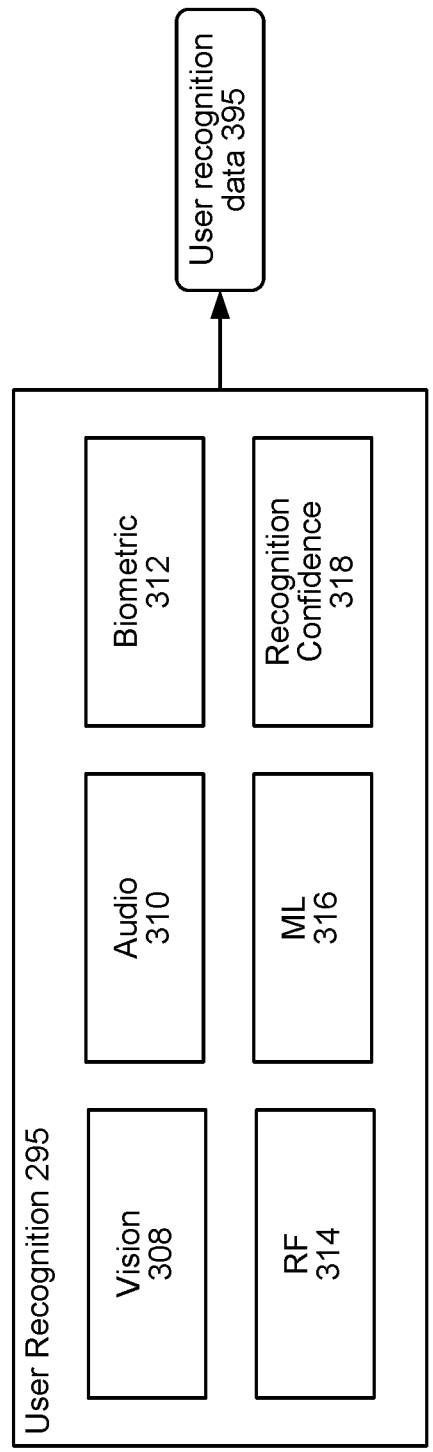
FIG. 3 is a conceptual diagram illustrating example types of user recognition processing that can be performed by a user recognition component, according to embodiments of the present disclosure.
Figure 4:
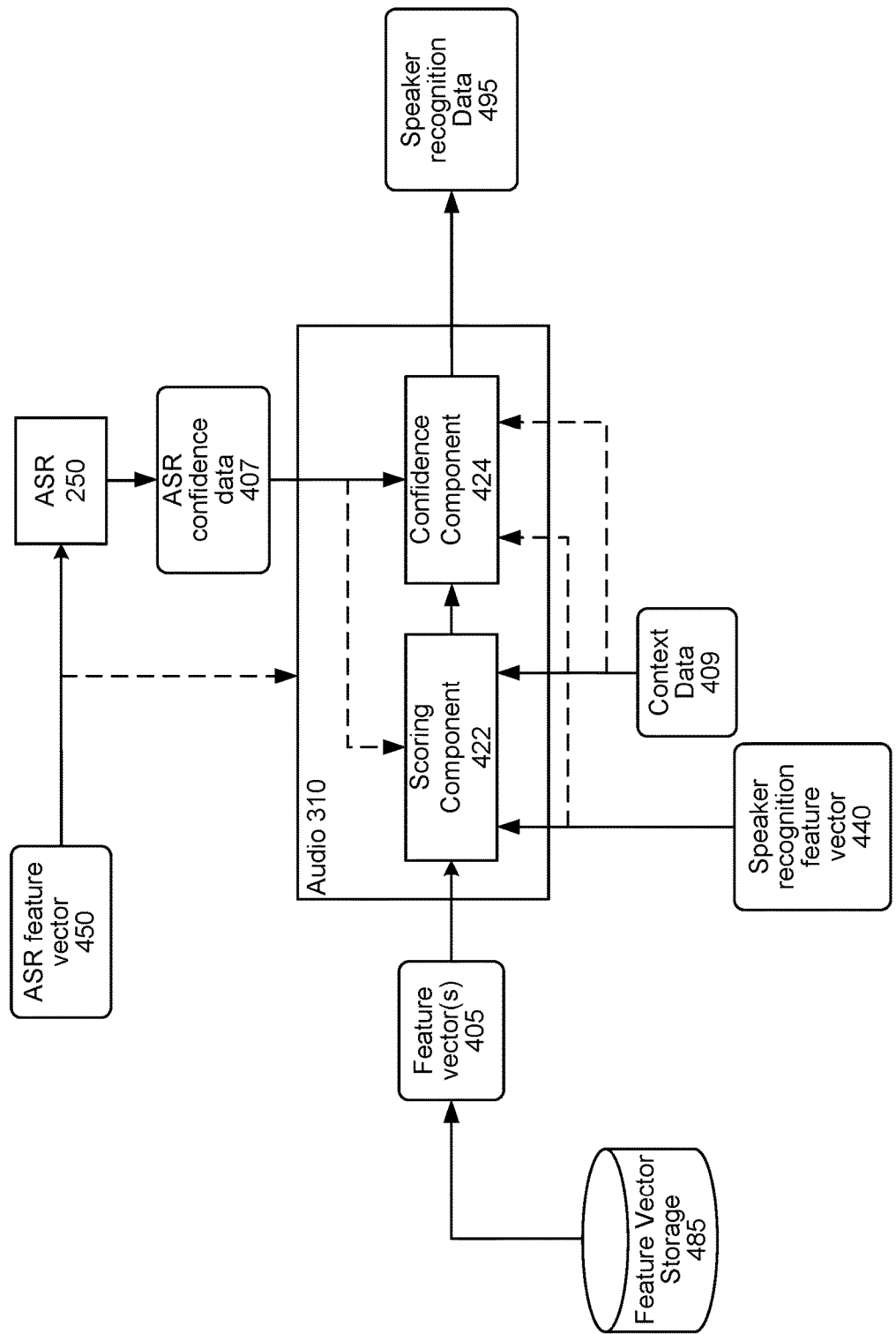
FIG. 4 is a conceptual diagram illustrating speaker recognition processing, according to embodiments of the present disclosure.

The speech processing system 120 may include a user recognition component 295 (as illustrated in FIGS. 2 and 3-4). In at least some embodiments, the user recognition component 295 may be implemented as a skill 225.

As illustrated in FIG. 3, the user recognition component 295 may include a vision component 308, an audio component 310, a biometric component 312, a radio frequency (RF) component 314, a machine learning (ML) component 316, and/or a recognition confidence component 318. In at least some instances, the user recognition component 295 may monitor data and determinations from various components to recognize an identity of one or more users associated with data input to the speech processing system 120. The user recognition component 295 may output user recognition data 395, which may include a user identifier associated with a user the user recognition component 295 believes originated data input to the speech processing system 120. The user recognition component 295 may be used to inform processes performed by various components of the speech processing system 120.

The vision component 308 may receive data from one or more sensors capable of providing images (e.g., cameras) or sensors indicating motion (e.g., motion sensors). The vision component 308 can perform facial recognition or image analysis to determine an identity of a user. In at least some instances, when a user is facing a camera, the vision component 308 may perform facial recognition and identify the user with a high degree of confidence. In at least some other instances, the vision component 308 may have a low degree of confidence of an identity of a user, and the user recognition component 295 may use determinations from additional components to determine an identity of a user. The vision component 308 can be used in conjunction with other components to determine an identity of a user. For example, the user recognition component 295 may use data from the vision component 308 with data from the audio component 310 to identify what user's face appears to be speaking at the same time audio is captured by the device 110 the user is facing for purposes of identifying a user who spoke an input to the speech processing system 120.

The system 100 of the present disclosure may include biometric sensors that transmit data to the biometric component 312. For example, the biometric component 312 may receive data corresponding to fingerprints, iris or retina scans, thermal scans, weights of users, a size of a user, pressure (e.g., within floor sensors), etc., and may determine a biometric profile corresponding to a user. Output of the biometric component 312 may be used to distinguish between a user and sound from a television, for example. Thus, output of the biometric component 312 may be used to adjust one or more confidences for determining an identity of a user. Biometric information, output by the biometric component 312, can be associated with specific user profile data such that the biometric information uniquely identifies a user profile of a user.

The RF component 314 may use RF localization to track devices that a user may carry or wear. For example, a user (and user profile data associated with the user) may be associated with a device. The device may emit RF signals (e.g., Wi-Fi, Bluetooth®, etc.). A device may detect the signal and indicate to the RF component 314 the strength of the signal (e.g., as a received signal strength indication (RSSI)). The RF component 314 may use the RSSI to determine an identity of a user (with an associated confidence level). In some instances, the RF component 314 may determine that a received RF signal is associated with a mobile device that is associated with a particular user identifier.

In some instances, the device 110 may include some RF or other detection processing capabilities so that a user who speaks an input may scan, tap, or otherwise acknowledge the user's personal device (such as a phone) to the device 110. In this manner, the user may "register" with the speech processing system 120 for purposes of the speech processing system 120 determining who spoke a particular input. Such a registration may occur prior to, during, or after speaking of an input.

The ML component 316 may track the behavior of various users as a factor in determining a user corresponding to a particular input. By way of example, a user may adhere to a regular schedule such that the user is at a first location during the day (e.g., at work or at school). In this example, the ML component 316 would factor in past behavior and/or trends in determining the identity of the user that provided input to the speech processing system 120. Thus, the ML component 316 may use historical data and/or usage patterns over time to increase or decrease a confidence level of an identity of a user.

In at least some instances, the recognition confidence component 318 may receive data output by two or more of the vision component 308, the audio component 310, the biometric component 312, the RF component 314, and the ML component 316, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 395.

The audio component 310 may receive data from one or more sensors capable of providing an audio signal (e.g., one or more microphones). The audio component 310 may perform audio recognition on an audio signal to determine an identity of the user and associated user identifier. In at least some instances, the audio component 310 may perform speaker recognition processing on all sound in an environment. In at least some instances, the audio component 310 may perform speaker recognition processing on audio data 211 input into the speech processing system 120 for speech processing. The audio component 310 may determine scores indicating whether speech in the audio data 211 originated from particular users. For example, a first score may indicate a likelihood that speech originated from a first user associated with a first user identifier, a second score may indicate a likelihood that speech originated from a second user associated with a second user identifier, etc. The audio component 310 may perform speaker recognition processing by comparing speech characteristics (represented in received audio data) to stored speech characteristics of users (e.g., stored voice profiles associated with the device 110 that captured the speech).

FIG. 4 illustrates speaker recognition processing as it may be performed by the audio component 310. The audio component 310 may receive ASR confidence data 407 output from the ASR component 250.

The audio component 310 performs speaker recognition processing using various data, including a speaker recognition feature vector 440 (representing a present speech), one or more stored feature vectors 405 (representing stored voice profiles), the ASR confidence data 407, and context data 409. The audio component 310 may output speaker recognition data 495 that reflects a certain confidence that the speech was spoken by one or more particular users. The audio component 310 may include one or more user identifiers (e.g., each corresponding to a different user's stored feature vector). Each user identifier, in the audio component 310, may be associated with a respective confidence value representing a likelihood that the speech corresponds to the user identifier's associated voice profile. A confidence value may be a numeric or binned value.

The feature vector(s) 405, input to the audio component 310, may correspond to one or more feature vectors associated with a device identifier corresponding to the device 110 that received the speech presently being processed. The audio component 310 may use the feature vector(s) 405 to compare against the speaker recognition feature vector 440, representing the present speech, to determine whether the speaker recognition feature vector 440 corresponds to one or more of the feature vectors 405.

Each feature vector 405 may be the same size as the speaker recognition feature vector 440. For example, if the speaker recognition feature vector 404 is encoded of size F, a feature vector 405 may also be encoded to size F.

To perform speaker recognition processing, the audio component 310 may determine the device 110 from which the audio data 211 originated. For example, the audio data 211 may be associated with metadata including a device identifier representing the device 110. Either the device 110 or the speech processing system 120 may generate the metadata. The speech processing system 120 may determine a group profile identifier associated with the device identifier, may determine user identifiers associated with the group profile identifier, and may include the group profile identifier and/or the user identifiers in the metadata. The remote system 120 may associate the metadata with the speaker recognition feature vector 440 produced from the audio data 211. In at least some embodiments, the metadata may be sent to the audio component 310 as context data 409.

The audio component 310 may query a feature vector storage 485 for feature vectors 405 associated with the device identifier, the group profile identifier, and/or the user identifiers represented in the metadata (e.g., represented in the context data 409). This limits the universe of possible feature vectors 405 the audio component 310 considers at runtime and thus decreases the amount of time to perform speaker recognition processing by decreasing the amount of feature vectors 405 needed to be processed. Alternatively, the audio component 310 may access all (or some other subset of) the feature vectors 405 available to the audio component 310 (e.g., stored in the feature vector storage 485). However, accessing all feature vectors 405 will likely increase the amount of time needed to perform speaker recognition processing based on the magnitude of feature vectors 405 to be processed.

The audio component 310 may attempt to identify the user that spoke the speech represented in the audio data 211 by comparing the speaker recognition feature vector 440 to the feature vector(s) 405. The audio component 310 may include a scoring component 422 that determines respective scores indicating whether the speech (represented by the speaker recognition feature vector 440) was spoken by one or more particular users (represented by the feature vector(s) 405). The audio component 310 may also include a confidence component 424 that determines an overall accuracy of speaker recognition processes (such as those of the scoring component 422) and/or an individual confidence value with respect to each user potentially identified by the scoring component 422. The output from the scoring component 422 may include a different confidence value for each received feature vector 405. Although illustrated as two separate components, the scoring component 422 and the confidence component 424 may be combined into a single component, or may be separated into more than two components.

The scoring component 422 and the confidence component 424 may implement one or more trained machine learning models (such neural networks, classifiers, etc.) as known in the art. For example, the scoring component 422 may use probabilistic linear discriminant analysis (PLDA) techniques. PLDA scoring determines how likely it is that the speaker recognition feature vector 440 corresponds to a particular feature vector 405. The PLDA scoring may generate a confidence value for each feature vector 405 considered and may output a list of confidence values associated with respective user identifiers. The scoring component 422 may additionally or alternatively use other techniques, such as GMMs, generative Bayesian models, or the like, to determine confidence values.

The confidence component 424 may receive various data including the ASR confidence data 407, speech length (e.g., number of frames or other measured length of the speech), audio condition/quality data (such as signal-to-interference data or other metric data), fingerprint data, image data, or other factors to consider how confident the audio component 310 is with regard to the confidence values linking users to the speech. The confidence component 424 may also consider the confidence values and associated identifiers output by the scoring component 422. For example, the confidence component 424 may determine that a lower ASR confidence (represented in the ASR confidence data 407), or poor audio quality, or other factors, may result in a lower confidence of the audio component 310. Whereas a higher ASR confidence (represented in the ASR confidence data 407), or better audio quality, or other factors, may result in a higher confidence of the audio component 310. Precise determination of the confidence may depend on configuration and training of the confidence component 424 and the model(s) implemented thereby. The confidence component 424 may operate using a number of different machine learning models/techniques such as GMM, neural networks, etc. For example, the confidence component 424 may be a classifier configured to map a score output by the scoring component 422 to a confidence value.

The audio component 310 may output speaker recognition data 495 specific to one or more user identifiers. For example, the audio component 310 may include each user identifier associated with a feature vector 405 input to the audio component 310. The speaker recognition data 495 may include numeric confidence values (e.g., 0.0-1.0, 0-1000, or whatever scale the system is configured to operate). Thus the speaker recognition data 495 may include an N-best list of user identifiers associated with respective numeric confidence values (e.g., user identifier 123—0.2, user identifier 234—0.8). Additionally or alternatively, the speaker recognition data 495 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." Thus the speaker recognition data 495 may include an N-best list of user identifiers associated with respective binned confidence values (e.g., user identifier 123—low, user identifier 234—high). Combined binned and numeric confidence value outputs are also possible. Rather than a list of user identifiers and their respective confidence values, the speaker recognition data 495 may only include information related to the top scoring user identifier. The audio component 310 may also output an overall confidence value that the individual confidence value(s) is correct, where the overall confidence value indicates how confident the audio component 310 is in the speaker recognition data 495.

The confidence component 424 may consider differences between individual confidence values when determining the speaker recognition data 495. For example, if a difference between a first confidence value and a second confidence value is large, and the first confidence value is above a threshold confidence value, then the audio component 310 is able to recognize a first user (associated with the feature vector 405 associated with the first confidence value) as the user that spoke the speech with a much higher confidence than if the difference between the confidence values were smaller.

The audio component 310 may perform thresholding to avoid incorrect speaker recognition data 495 being output. For example, the audio component 310 may compare a confidence value, output by the confidence component 424, to a threshold confidence value. If the confidence value does not satisfy (e.g., does not meet or exceed) the threshold confidence value, the audio component 310 may not output speaker recognition data 495, or may only include in that data 495 an indicator that a user could not be recognized.

The audio component 310 may be defaulted to output binned (e.g., low, medium, high) speaker recognition confidence values. However, such may be problematic in certain situations. For example, if the audio component 310 computes a single binned confidence value for multiple feature vectors 405, the audio component 310 may not be able to effectively determine which user originated the speech. In this situation, the audio component 310 may be configured to override its default setting and output numeric confidence values. This enables the audio component 310 to determine a user, associated with the highest numeric confidence value, originated the speech.

The audio component 310 may consider context data 409 to inform speaker recognition processing. A trained model(s) or other component of the audio component 310 may be trained to take context data 409 as an input feature when performing speaker recognition processing. The context data 409 may include a variety of data types depending on system configuration and may be made available from other sensors, devices, or storage. The context data 409 may include a time of day when the audio data 211 was generated by or received from the device 110, a day of a week when the audio data audio data 211 was generated by or received from the device 110, etc.

The context data 409 may include data output by the vision component 308. For example, the vision component 308 may perform facial recognition processing on image or video data received from the device 110 from which the audio data 211 was received (or another device). The output of the vision component 308 may be used by the audio component 310. That is, facial recognition output data may be used in conjunction with the comparison of the speaker recognition feature vector 440 and one or more feature vectors 405 to perform more accurate speaker recognition processing.

The context data 409 may include location data representing a location (e.g., a geographic location, a particular location within a building, etc.) of the device 110. The location data may represent a geographic location (e.g., country, state, town, etc.) where the device 110 is located. The location data may additionally or alternatively represent a specific location within a building. For example, if the device 110 is located in user A's bedroom, such location may increase a speaker recognition confidence value associated with user A and/or decrease a speaker recognition confidence value associated with user B.

The context data 409 may indicate a type of the device 110. Different types of devices may include, for example, a smart watch, a smart phone, a tablet computer, and a vehicle. The type of the device 110 may be indicated in a profile associated with the device 110. For example, if the device 110, from which the audio data 211 was received, is a smart watch or vehicle belonging to a user A, the fact that the device 110 belongs to user A may increase a speaker recognition confidence value associated with user A and/or decrease a speaker recognition confidence value associated with user B.

The context data 409 may include global positioning system (GPS) information associated with the device 110. For example, a group profile associated with a vehicle may indicate multiple users (e.g., user A and user B). The vehicle may include a GPS indicating latitude and longitude coordinates of the vehicle when the audio data 211 is generated by the vehicle. As such, if the vehicle is located at a coordinate corresponding to a location (e.g., work, home, school, etc.) associated with user A, such may increase a speaker recognition confidence value associated with user A and/or decrease speaker recognition confidence values of all other users indicated in a group profile associated with the vehicle. Global coordinates and associated locations (e.g., work, home, etc.) may be indicated in a profile associated with the device 110. The global coordinates and associated locations may also or alternatively be associated with one or more user profiles.

The context data 409 may indicate activity of a particular user that may be useful in performing speaker recognition processing. For example, if a user has recently entered a code to disable a home security alarm, and the audio data 211 was received from a device 110 represented in a group profile associated with the home, signals from the home security alarm about the disabling user, time of disabling, etc. may be reflected in the context data 409 and considered by the audio component 310. If a mobile device (such as a smart phone, Tile, dongle, or other device) known to be associated with a particular user is detected proximate to (for example physically close to, connected to the same WiFi network as, or otherwise nearby) the device 110, this may be reflected in the context data 409 and considered by the audio component 310.

Various machine learning techniques may be used to train and operate models to perform various processes described herein. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Referring again to FIG. 2, the speech processing system 120 may include profile storage 270. The profile storage 270 may include a variety of data related to individual users, groups of users, devices, etc. that interact with the speech processing system 120. As used herein, a "profile" refers to a set of data associated with a user, group of users, device, etc. Profile data may include preferences specific to the user, group of users, device, etc.; input and output capabilities of one or more devices; internet connectivity data; user bibliographic data; subscription data; and/or other data.

The profile storage 270 may include one or more instances of user profile data, with each instance of user profile data corresponding to a different user. Each instance of user profile data may be associated with a different user identifier. Each instance of user profile data may include various user identifying data. Each instance of user profile data may also include preferences of the corresponding user. Each instance of user profile data may include one or more device identifiers, representing one or more devices registered to the corresponding user. Each instance of user profile data may include skill identifiers of skills 225 that the corresponding user has enabled. When a user enables a skill 225, the user is providing the speech processing system 120 with permission to allow the skill 225 to execute with respect to the user's inputs. If a user does not enable a skill 225, the speech processing system 120 may not invoke the skill 225 to execute with respect to the user's inputs.

The profile storage 270 may include one or more instances of group profile data, with each instance of group profile data corresponding to a different group of users. Each instances of group profile data may be associated with a different group identifier. An instance of group profile data may be associated with two or more instances of user profile data. For example, an instance of group profile data may correspond to a household profile that is associated with multiple users of a single household. An instance of group profile data may include preferences shared by all the instances of user profile data associated therewith. Each instances of user profile data, associated with an instance of group profile data, may additionally include preferences specific to the user associated therewith. That is, an instance of user profile data may include preferences unique from one or more other instances of user profile data associated with the same group profile data. An instance of group profile data may be associated with one or more instances of device profile data corresponding to one or more devices.

The profile storage 270 may include one or more instances of device profile data, with each instance of device profile data correspond to a different device 110. Each instance of device profile data may be associated with a different device identifier (e.g., device serial number). An instance of device profile data may include various device identifying data, input/output characteristics, networking characteristics, etc. An instance of device profile data may include one or more user identifiers, corresponding to one or more users that interact with the device of the device profile data. For example, a household device's profile data may include user identifiers of users of the household.

Referring now to FIGS. 5A-5C, it is described how the speech processing system 120 may adjust a speech processing system-executable NLU intent, representing a user input, into a device-executable NLU intent for the purpose of responding to the user input. As illustrated in FIG. 5A, a policy component 285, of the speech processing system 120, may receive (502) NLU output data representing the user input. In general, the policy component 285 may determine whether downstream processing (e.g., by one or more skills 225) is to be configured based at least in part on whether the user 5 is authorized to have the first NLU intent, represented in the NLU output data, executed by the speech processing system 120. In some embodiments, the policy component 285 may determine whether downstream processing is to be configured based at least in part on whether the user 5 has purchased a data subscription.

The policy component 285 may communicate with or include a policy storage storing policies including conditions that, when satisfied, indicate downstream processing is to be configured based at least in part on whether the speech processing system 120 is authorized to execute the first NLU intent (e.g., based on whether the user 5 has purchased a data subscription enabling the speech processing system 120 to execute the first NLU intent). The policy storage may store one or more policies indicating downstream processing is to be based at least in part on whether the speech processing system 120 is authorized to execute the first NLU intent, when the policy component 285 receives NLU output data including a particular NLU intent. For example, a policy may be triggered when the first NLU intent is a <PlayMusic> intent, <PlayPodcast> intent, <PlayNews> intent, <PlayVideo> intent, and the like.

The policy storage may additionally or alternatively store one or more policies indicating downstream processing is to be based at least in part on whether the speech processing system 120 is authorized to execute the first NLU intent, when the policy component 285 receives NLU output data including a particular NLU intent and the device 110 corresponds to a particular device type. For example, a policy may be triggered when the first NLU intent is a <PlayMusic> intent and the device 110 corresponds to a "vehicle," "child," "guest," or other like device type. For further example, a policy may be triggered when the first NLU intent is a <PlayPodcast> intent and the device 110 corresponds to a "vehicle," "child," "guest," or other like device type. In another example, a policy may be triggered when the first NLU intent is a <PlayVideo> intent and the device 110 corresponds to a "vehicle," "child," "guest," or other like device type. For further example, a policy may be triggered when the first NLU intent is a <PlayNews> intent and the device 110 corresponds to a "vehicle," "child," "guest," or other like device type.

The policy storage may additionally or alternatively store one or more policies indicating downstream processing is to be based at least in part on whether the speech processing system 120 is authorized to execute the first NLU intent, when the policy component 285 receives NLU output data indicating a particular domain and the device 110 corresponds to a particular device type. For example, a policy may be triggered when the NLU output data indicates a music domain and the device 110 corresponds to a "vehicle," "child," "guest," or other like device type. For further example, a policy may be triggered when the NLU output data indicates a podcast domain and the device 110 corresponds to a "vehicle," "child," "guest," or other like device type. In another example, a policy may be triggered when the NLU output data indicates a video domain and the device 110 corresponds to a "vehicle," "child," "guest," or other like device type. For further example, a policy may be triggered when the NLU output data indicates a news domain and the device 110 corresponds to a "vehicle," "child," "guest," or other like device type.

The policy component 285 may determine (504) context data associated with the user input. In some embodiments, the policy component 285 may directly query one or more context data sources (e.g., the profile storage 270) for the context data. In some embodiments, the speech processing system 120 may implement a context aggregation component configured to aggregate various context data, corresponding to a user input, from various context data sources. In such embodiments, the policy component 285 may query the context aggregation component for the context data, and the context aggregation component may query one or more context data sources for the context data.

The context data may include information usable by the policy component 285 to determine whether the speech processing system 120 is authorized to execute the first NLU intent in the NLU output data. For example, the policy component 285 may determine context data including a user identifier corresponding to the user 5, a device identifier (e.g., serial number) corresponding to the device 110, a device account identifier (e.g., identifying a particular combination of the device 110 and the user 5), a device type corresponding to the device 110, a location of the device 110, the first NLU intent represented in the NLU output data, and/or the domain represented in the NLU output data.

The policy component 285 may determine (506) the speech processing system 120 is not authorized to execute the first NLU intent. In some embodiments, the policy component 285 may determine the speech processing system 120 is not able to execute the first NLU intent based at least in part on the device 110 corresponding to a "child" or "guest" device type. Generally, when a device is associated with a "child" or "guest" device type, the speech processing system 120 may only be authorized to execute certain NLU intents. For example, when the device 110 corresponds to the child or guest device type, the speech processing system 120 may not be authorized to execute intents including, but not limited to, a <Purchase> intent, an <UnlockDoor> intent, a <LockDoor> intent, and a <TurnOn> intent that results in the turning on of an appliance (e.g., a stove, microwave, etc.).

In some embodiments, the policy component 285 may determine the speech processing system 120 is not able to execute the first NLU intent based at least in part on the type of user. For example, the user recognition component 295 may output a user identifier corresponding to the user 5. The policy component 285 may determine the user identifier is associated with an indicator representing the user 5 corresponds to a particular type of user (e.g., a "child" or "guest" user). Generally, when a user is associated with a "child" or "guest" user type, the speech processing system 120 may only be authorized to execute certain NLU intents. For example, when the user 5 corresponds to the child or guest user type, the speech processing system 120 may not be authorized to execute intents including, but not limited to, a <Purchase> intent, an <UnlockDoor> intent, a <LockDoor> intent, and a <TurnOn> intent that results in the turning on of an appliance (e.g., a stove, microwave, etc.).

In some embodiments, the policy component 285 may determine the speech processing system 120 is not able to execute the first NLU intent based at least in part on a location of the device 110. For example, the user input may request the playing of a football game, and the NLU output data may include a <PlayTV> intent, a "game" entity type, and an entity value of "Seahawks." In this example, the football game may be blacked out for the location of the device 110 (i.e., provided from being played from the location of the device 110). Thus, based on the location of the device 110, the policy component 285 may determine the speech processing system 120 is unable to execute the <PlayTV> intent.

In some embodiments, the policy component 285 may include, or otherwise communicate with, a subscription storage storing data representing which users have purchased data subscriptions for which devices 110. For example, an entry in the subscription storage may include a user identifier and information representing a data subscription type (e.g., free trial period, purchased, unlimited, 2 gigabyte (GB) per month, 4 GB per month, etc.) presently being used/purchased by the user corresponding to the user identifier. For further example, an entry in the subscription storage may include a device identifier and information representing a data subscription type presently being used/purchased for a device 110 corresponding to the device identifier. In another example, an entry in the subscription storage may include a user identifier, a device identifier, and information representing a data subscription type presently being used/purchased by the user, corresponding to the user identifier, for a device 110 corresponding to the device identifier. For further example, an entry in the subscription storage may include a device account identifier and information representing a data subscription type presently being used/purchased for by a user and for a device 110 corresponding to the device account identifier.

The policy component 285 may query the data subscription storage for a data subscription type based at least in part on the context data. For example, the policy component 285 may query the subscription storage for a data subscription type associated with a user identifier, device identifier, and/or device account identifier represented in the context data.

In some embodiments, the subscription data may be represented in device profile data. In such embodiments, the policy component 285 may determine a device identifier of the device 110, and query the profile storage 270 for subscription data associated with the device identifier.

In some instances, in response to the query, the policy component 285 may receive data representing the data subscription storage does not contain data subscription information associated with the context data (e.g., the user identifier, device identifier, and/or device account identifier represented in the context data). Consequently, the policy component 285 may determine the speech processing system 120 is unauthorized to execute the first NLU intent.

Based on determining the speech processing system 120 is unauthorized to execute the first NLU intent, the policy component 285 may generate (508) output data representing execution of the first NLU intent is not authorized. In some embodiments, the policy component 285 may generate the output data to include text data including natural language text representing execution of the user input requires a data subscription. In some other embodiments, the policy component 285 may send, to the TTS component 280, data representing execution of the user input requires a data subscription, and may thereafter receive, from the TTS component 280, audio data including synthesized speech representing execution of the user input requires a data subscription. In yet some other embodiments, the policy component 285 may generate the output data to include the foregoing text data and audio data. For example, if the user input requests music be streamed to the device 110, the aforementioned natural language text and synthesized speech may correspond to "streaming music is not available without a data plan." For further example, if the user input requests a football game be streamed to the device 110, the aforementioned natural language text and synthesized speech may correspond to "playing of the football game is not available for your location."

The policy component 285 may send (510) the output data to the device 110. In response, the device 110 may output (512) content corresponding to the output data. For example, if the output data includes text data including natural language text, the device 110 may display the natural language text. For further example, if the output data includes audio data including synthesized speech, the device 110 may output audio corresponding to the synthesized speech. In another example, if the output data includes the foregoing text data and audio data, the device 110 may display the foregoing natural language text and output the foregoing audio corresponding to the synthesized speech.

Before, while, or after causing the device 110 to output the content, and in response to the policy component 285 determining the speech processing system 120 is unauthorized to execute the first NLU intent, the policy component 285 may associate (514) a policy indicator with the NLU output data. Generally, the policy indicator may be data representing to downstream components (e.g., skills 225) that processing is to be based at least in part on whether the speech processing system 120 is authorized to execute the first NLU intent. In some embodiments, the policy indicator may be referred to as a policy flag.

The policy component 285 may send (516) the NLU output data and associated policy indicator to a content skill 225a associated with the NLU intent and/or domain represented in the NLU output data. For example, the policy component 285 may send the NLU output data and associated policy indicator to a music skill (i.e., capable of outputting audio data corresponding to music) when the NLU output data includes a <PlayMusic> intent and/or indicates a music domain. For further example, the policy component 285 may send the NLU output data and associated policy indicator to a podcast skill (i.e., capable of outputting audio data corresponding to podcast episodes) when the NLU output data includes a <PlayPodcast> intent and/or indicates a podcast domain. In another example, the policy component 285 may send the NLU output data and associated policy indicator to a news skill (i.e., capable of outputting audio data corresponding to news stories) when the NLU output data includes a <PlayNews> intent and/or indicates a news domain. For further example, the policy component 285 may send the NLU output data and associated policy indicator to a video skill (i.e., capable of outputting video data and/or multimedia data including video and audio) when the NLU output data includes a <PlayVideo> intent and/or indicates a video domain. The context skill 225a may be implemented by or in communication with the speech processing system 120.

The content skill 225a may be configured to determine whether received NLU output data is associated with the policy indicator. If the content skill 225a determines received NLU output data is not associated with the policy indicator, the content skill 225a may process to output data responsive to the user input. For example, if a music skill determines received NLU output data is not associated with the policy indicator, and the NLU output data includes a <PlayMusic> intent, a "title" entity type, and an entity value corresponding to a song title, the music skill may output audio data corresponding to a song having the song title. For further example, if a podcast skill determines received NLU output data is not associated with the policy indicator, and the NLU output data includes a <PlayPodcast> intent, a "title" entity type, and an entity value corresponding to a podcast title, the podcast skill may output audio data corresponding to an episode of a podcast having the podcast title. In another example, if a news skill determines received NLU output data is not associated with the policy indicator, and the NLU output data includes a <PlayNews> intent, a "publisher" entity type, and an entity value corresponding to a news publisher, the news skill may output audio data corresponding to a news article published by the news publishers. For further example, if a video skill determines received NLU output data is not associated with the policy indicator, and the NLU output data includes a <PlayVideo> intent, a "title" entity type, and an entity value corresponding to a movie title, the video skill may output multimedia data (i.e., including audio data and video data) corresponding to a movie having the movie title.

However, in the situation of FIG. 5B, the content skill 225a may determine (518) the NLU output data is associated with the policy indicator. In response to such a determination, the content skill 225a may send (520) the NLU output data and the policy indicator to a recommendation skill 225b. The recommendation skill 225b may be implemented by or in communication with the speech processing system 120. In general, the recommendation skill 225b may be configured to determine, based on various data, whether a data subscription is to be recommended to the user 5.

In the example of FIG. 5B, the recommendation skill 225b may determine (522) a data subscription (e.g., a free trial or a paid subscription) is not to be recommended to the user 5. The recommendation skill 225b may make such determination based on various data. The recommendation skill 225b may determine whether to recommend the data subscription based on the first NLU intent represented in the NLU output data. The recommendation skill 225b may additionally or alternatively determine whether to recommend the data subscription based on the domain represented in the NLU output data. The recommendation skill 225b may additionally or alternatively determine whether to recommend the data subscription based on a number of user inputs between the instant user input and a most recent instance a data subscription was recommended to the user 5.

In response to determining a data subscription is not to be recommended, the recommendation skill 225b may send (524) an alter intent directive to the content skill 225a. The alter intent directive may indicate to the content skill 225a that the content skill is to determine a second NLU intent that results in the output of content similar or identical to that would be output in response to execution of the first NLU intent included in the NLU output data, but that is executable by the device 110 (e.g., that can be executed by the device 110 without assistance from the speech processing system 120). In at least some embodiments, the content skill 225a may be configured to determine a second NLU intent that is a best non-streaming alternative to the first NLU intent. In at least some embodiments, the content skill 225a may determine the second NLU intent based at least in part on the content type of data output in response to execution of the first NLU intent, computing components of the device 110, I/O interfaces of the device 110, and/or a location of the device 110.

To this end, the content skill 225a may determine (526) execution of the first NLU intent includes outputting a content type. For example, if the user input requests the output of a song, the content skill 225a may determine the content type to be "music." For further example, if the user input requests the output of a podcast, the content skill 225a may determine the content type to be "podcast." In another example, if the user input requests the output of news, the content skill 225a may determine the content type to be "news." In at least some embodiments, the content skill 225a may determine the content type to be the domain represented in the NLU output data.

The content skill 225a may also determine (528) computing components of the device 110. In some embodiments, the computing components may include one or more media players installed on the device 110. For example, the content skill 225a may determine the device 110 includes a radio receiver, a device that receives radio waves (e.g., AM and/or FM radio waves) and converts the information carried by them to a usable form. In some embodiments, the content skill 225a may determine the device 110 includes a satellite radio receiver, which may receive audio programming from a direct broadcast satellite.

In some embodiments, when the user 5 registers the device 110 to be represented in the user's profile data, the speech processing system 120 may generate device profile data, associated with the device's identifier (e.g., the device's serial number), in the profile storage 270. As part of generating the device profile data, the speech processing system 120 may determine a device manufacturer skill corresponding to a device manufacturer of the device 110, may query the device manufacturer skill for data representing the computing components of the device 110, and may store correspond received data in the device profile data. To this end, the content skill 225a may determine the computing components of the device 110 by determining a device identifier of the device 110, and querying the profile storage 270 for computing component information associated with the device identifier. In some other embodiments, the content skill 225a may determine the computing components of the device 110 by determining the device identifier of the device 110, determining a device manufacturer skill corresponding to a manufacturer of the device 110a, and querying the device manufacturer skill for computing component information associated with the device identifier.

The content skill 225a may also determine (530) one or more I/O interfaces of the device 110. In some embodiments, the determined I/O interfaces may be I/O interfaces through which a second device (e.g., a smart phone) may be connected to the device 110. For example, the content skill 225a may determine the one or more I/O interfaces to include Bluetooth and/or one or more USB ports.

In some embodiments, as part of generating the device profile data for the device 110, the speech processing system 120 may determine a device manufacturer skill corresponding to a device manufacturer of the device 110, may query the device manufacturer skill for data representing the I/O interface(s) of the device 110, and may store correspond received data in the device profile data. To this end, the content skill 225a may determine the I/O interface(s) of the device 110 by determining a device identifier of the device 110, and querying the profile storage 270 for I/O interface information associated with the device identifier. In some other embodiments, the content skill 225a may determine the computing components of the device 110 by determining the device identifier of the device 110, determining a device manufacturer skill corresponding to a manufacturer of the device 110a, and querying the device manufacturer skill for I/O interface information associated with the device identifier.

The content skill 225a may also determine (532) a location of the device 110. In some embodiments, the device 110 may include a global positioning system (GPS) component configured to determine a present geographic location of the device 110. The device 110 may be configured to periodically indicate, to the speech processing system 120, a present geographic location (e.g., present GPS coordinates) of the device 110. When the speech processing system 120 receives present geographic location data from the device 110, the speech processing system 120 may update a present geographic location section, of device profile data associated with the device 110, to represent the newly received present geographic location data. Thus, to determine the location of the device 110, the content skill 225a may determine a device identifier of the device 110, and may query the profile storage 270 for a present geographic location associated with the device identifier.

The content skill 225a may determine (534) the second NLU intent based at least in part on the content type output in response to execution of the first NLU intent, the computing components of the device 110, the I/O interface(s) of the device 110, and the location of the device 110. As an example, the first NLU intent may be a <PlayMusic> intent and the content skill 225a may determine a "music" content type is output in response to execution of the <PlayMusic> intent. The content skill 225a may also determine that the device 110 includes a radio and/or satellite receiver. Based on the foregoing, the content skill 225a may determine the second NLU intent to be a <PlayRadio> intent as execution of the <PlayRadio> intent is configured to output music locally by the device 110 using the radio and/or satellite receiver.

For further example, the first NLU intent may be a <PlayMusic> intent and the content skill 225a may determine a "music" content type is output in response to execution of the <PlayMusic> intent; the first NLU intent may be a <PlayPodcast> intent and the content skill 225a may determine a "podcast" content type is output in response to execution of the <PlayPodcast> intent; or the first NLU intent may be a <PlayNews> intent and the content skill 225a may determine a "news" content type is output in response to execution of the <PlayNews> intent. The content skill 225a may also determine that the device 110 includes a Bluetooth and/or USB I/O interface. Based on the foregoing, the content skill 225a may determine the second NLU intent to be a <ActivateI/OInterface> intent as execution of the <ActivateI/OInterface> intent is configured to enable a second device (e.g., a smart phone) to output music, podcast, and/or news content locally via the device 110.

In another example, the first NLU intent may be a <PlayPodcast> intent and the content skill 225a may determine a "podcast" content type is output in response to execution of the <PlayPodcast> intent. The content skill 225a may also determine that the device 110 includes a radio and/or satellite receiver. Based on the foregoing, the content skill 225a may determine the second NLU intent to be a <PlayRadio> intent as execution of the <PlayRadio> intent is configured to output content, corresponding to same genre (e.g., comedy, current events, sports, etc.) as the requested podcast, locally by the device 110 using the radio and/or satellite receiver.

In some embodiments, in addition to determining the second NLU intent, the content skill 225a may determine (536) one or more entity types and/or one or more entity values to be used in conjunction with the second NLU intent to respond to the user input. The content skill 225a may determine the entity type(s) and entity value(s) using various techniques.

In the example where the content skill 225a determines the second NLU intent to be a <PlayRadio> intent, the content skill 225a may determine a "station" entity type; and an entity value corresponding to a call sign of a particular AM, FM, or satellite radio station and/or an entity value corresponding to an amplitude (i.e., in the case of an AM radio station) or frequency (i.e., in the case of a FM radio station) of the radio station. Generally, AM and FM radio stations have limited broadcasting radii. In some embodiments, the content skill 225a may obtain a list of radio stations, presently detectable by the device 110, by querying a radio skill for radio station information associated with AM and/or FM radio stations detected at the location of the device 110 (e.g., indicated in the device's device profile data as a present location). In response to receiving the radio station information from the radio skill, the content skill 225a may determine the radio station call sign and/or amplitude or frequency entity values.

In some embodiments, the content skill 225a may select particular radio station call sign and/or amplitude or frequency entity values based on an entity type(s) and/or entity value(s) represented in the NLU output data representing the user input. The radio station information, received from the radio skill, may include genre information indicating genres (e.g., rock, jazz, pop, news, comedy, sports, talk, etc.) of different radio stations. Thus, for example, if the content skill 225a determines the NLU output data includes a "genre" entity type and a "jazz" entity value, the content skill 225a may determine a radio station call sign and/or amplitude or frequency entity values associated with a "jazz" genre in the received radio station information. For further example, if the content skill 225a determines the NLU output data includes a "genre" entity type and a "news" entity value, the content skill 225a may determine a radio station call sign and/or amplitude or frequency entity values associated with a "news" genre in the received radio station information.

In the example where the content skill 225a determines the second NLU intent to be an <ActivateI/OInterface> intent, the content skill 225a may determine an "I/O interface" entity type and an entity value corresponding to a particular I/O interface of the device 110. For example, if the content skill 225a determines the device 110 includes a Bluetooth I/O interface, the content skill 225a may determine an entity value of "Bluetooth." For further example, if the content skill 225a determines the device 110 includes a USB I/O interface, the content skill 225a may determine an entity value of "USB." In another example, if the content skill 225a determines the device 110 includes both a Bluetooth I/O interface and a USB I/O interface, the content skill 225a may determine an entity value of "Bluetooth" or "USB."

After determining the second NLU intent, and optionally the entity type(s) and entity value(s), the content skill 225a may generate (538) a directive (i.e., data) representing the second NLU intent is to be executed, and in some embodiments is to be executed in view of the determined entity type(s) and entity value(s). For example, the directive may indicate the device 110 is to play a particular AM, FM, or satellite radio station. For further example, the directive may indicate the device 110 is to activate a particular I/O interface of the device 110. The content skill 225a may send (540) the directive to the device 110.

The device 110 may process (542) in response to the directive. For example, if the directive indicates the device 110 is to play a particular AM, FM, or satellite radio station, the device 110 may tune a radio or satellite receiver to the particular station. For further example, if the directive indicates the device 110 is to activate a particular I/O interface, the device 110 may activate the particular I/O interface so that the device 110 may begin receiving data, from a second device (e.g., a smart phone), via the I/O interface.

In some embodiments, the directive may include or be associated with output data representing the processing the device 110 is to perform. In some embodiments, the output data may include audio data including synthesized speech indicating the processing to be performed by the device 110. In other embodiments, the output data may include text data including natural language text indicating the processing to be performed by the device 110. In yet other embodiments, the output data may include audio data, including synthesized speech indicating the processing to be performed by the device 110, as well as text data including natural language text indicating the processing to be performed by the device 110. For example, directive indicates a particular radio station is to be played, the output data may correspond to "Here's a radio station you may like." For further example, if the directive indicates a particular I/O interface is to be activated, the output data may correspond to "I am activating the USB port so you may connect your phone to play [requested output content in user input]."

In some embodiments, the content skill 225a may determine a device manufacturer skill corresponding to a device manufacturer of the device 110, and may send the directive, and optionally output data, to the device manufacturer skill. In turn, the device manufacturer skill may send the directive, and optionally output data, to the device 110.

While FIG. 5C illustrates a directive being sent to the device 110, the present disclosure is not limited thereto. For example, the content skill 225a may cause the device 110 to execute the second NLU intent (optionally in view of an entity type(s) and entity value(s)) by send the second NLU intent (and entity type(s) and entity value(s)) to the device 110. In such instances, the device 110 may include computing components (e.g., skills 225) configured to process the received second NLU intent (and entity type(s) and entity value(s)) to locally execute the second NLU intent.

In some embodiments, the speech processing system 120 may recommend a data subscription to the user 5 and prior to causing the device 110 to execute the second NLU intent. The following describes, and FIGS. 6A-6B illustrate, the processing that may be performed when the speech processing system 120 recommends and the user 5 accepts a data subscription. As illustrated in FIG. 6A, steps 502-520 may be performed. After such, the recommendation skill 225b may determine (602) a data subscription (e.g., a free trial or a paid subscription) is to be recommended to the user 5. The recommendation skill 225b may make such determination based on various data. The recommendation skill 225b may determine whether to recommend the data subscription based on the first NLU intent represented in the NLU output data. The recommendation skill 225b may additionally or alternatively determine whether to recommend the data subscription based on the domain represented in the NLU output data. The recommendation skill 225b may additionally or alternatively determine whether to recommend the data subscription based on a number of user inputs between the instant user input and a most recent instance a data subscription was recommended to the user 5.

Based on determining the data subscription is to be recommended, the recommendation skill 225b may generate (604) output data recommending the data subscription. In some embodiments, the recommendation skill 225b may generate the output data to include text data including natural language text recommending the data subscription. In some other embodiments, the recommendation skill 225b may send, to the TTS component 280, data recommending the data subscription, and may thereafter receive, from the TTS component 280, audio data including synthesized speech recommending the data subscription. In yet some other embodiments, the recommendation skill 225b may generate the output data to include the foregoing text data and audio data. For example, if the user 5/device 110 presently does not have a data subscription, the aforementioned natural language text and synthesized speech may correspond to "To use streaming services, you'll need a data plan. A 30 day free trial is presently available. Would you like to activate it? You can cancel anytime." For further example, if the user 5/device 110 presently does not have a data subscription, the aforementioned natural language text and synthesized speech may correspond to "To use streaming services, you'll need a data plan. An unlimited data plan is available for $15 a month. Would you like to purchase it? You can cancel anytime."

The recommendation skill 225b may send (606) the output data to the device 110. In response, the device 110 may output (608) content corresponding to the output data. For example, if the output data includes text data including natural language text, the device 110 may display the natural language text. For further example, if the output data includes audio data including synthesized speech, the device 110 may output audio corresponding to the synthesized speech. In another example, if the output data includes the foregoing text data and audio data, the device 110 may display the foregoing natural language text and output the foregoing audio corresponding to the synthesized speech.

After outputting the content, the device 110 may receive (610) a user input indicating acceptance of the data subscription. For example, the device 110 may receive audio corresponding to a spoken natural language user input accepting the recommended data subscription. In another example, the device 110 may receive a typed natural language user input accepting the recommended data subscription. For further example, the device 110 may include or be in communication with a camera(s) that captures a sequence of images representing the user 5 performing a gesture accepting the recommended data subscription (e.g., a thumbs up, the nodding of the user's head, etc.). In another example, the device 110 may display a button indicating acceptance of the recommended data subscription, and the device 110 may detect the user 5 interacting with the button.

The device 110 may send (612), to the recommendation skill 225b, input data representing the user input accepting the recommended data subscription. For example, the input data may be audio data when the device 110 receives a spoken natural language user input. In another example, the input data may be text data when the device 110 receives a typed natural language user input. For further example, the input data may be image data when the device 110 receives a sequence of images representing the user 5 performing a gesture. Or the device 110 may process the sequence of images to determine the gesture, and may send an indication of the gesture to the speech processing system 120. In another example, when the device 110 detects the user 5 interacting with a button, the device 110 may send input data (representing the button interaction) to the speech processing system 120.

After receiving the input data, the recommendation skill 225b may determine (614) the input data accepts the recommended data subscription. For example, if the recommendation skill 225b receives audio data from the device 110, the recommendation skill 225b may send the input data to the ASR component 250, the ASR component 250 may perform ASR processing on the audio data to generate ASR output data, the NLU component 260 may perform NLU processing on the ASR output data to generate NLU output data indicating the user input accepts the recommended data subscription, and the NLU output data may be sent to the recommendation skill 225b. Alternatively, the recommendation skill 225b may send the audio data to the SLU component 240, and the SLU component 240 may perform SLU processing on the audio data to generate the NLU output data. In another example, if the recommendation skill 225b receives text data from the device 110, the recommendation skill 225b may send the text data to the NLU component 260, and the NLU component 260 may perform NLU processing on the text data to generate the NLU output data. For further example, if the recommendation skill 225b receives image data from the device 110, the recommendation skill 225b may send the image data to a computer vision component of the speech processing system 120, and the computer vision component may perform computer vision processing on the image data to determine the user-performed gesture, determine the gesture indicates acceptance of the recommended data subscription, and send data indicating the acceptance to the recommendation skill 225b. In another example, if the recommendation skill 225b receives data representing a performed gesture, the recommendation skill 225b may send the data to the computer vision component, and the computer vision component may determine the gesture indicates acceptance of the recommended data subscription, and send data indicating the acceptance to the recommendation skill 225b. For further example, if the recommendation skill 225b receives data representing a button interaction, the recommendation skill 225b may determine the button interaction indicates acceptance of the recommended data subscription.

After determining the input data accepts the data subscription, the recommendation skill 225b may activate (616) the data subscription (e.g., a free trial subscription or a paid subscription). Activation of the data subscription may involve one or more recommendation skill outputs (e.g., which may be output to the user 5 via the device 110 as audio and/or displayed text) and responsive user inputs to gather information (e.g., user name, address, credit card information, etc.) needed to activate the data subscription.

After activating the data subscription, the recommendation skill 225b may generate (618) output data indicating the data subscription has been activated. In some embodiments, the recommendation skill 225b may generate the output data to include text data including natural language text indicating the data subscription has been activated. In some other embodiments, the recommendation skill 225b may send, to the TTS component 280, data indicated the data subscription has been activated, and may thereafter receive, from the TTS component 280, audio data including synthesized speech indicating the data subscription has been activated. In yet some other embodiments, the recommendation skill 225b may generate the output data to include the foregoing text data and audio data. For example, if the aforementioned natural language text and synthesized speech may correspond to "You're all set! You'll be charged on the [nth] day of each month."

The recommendation skill 225b may send (620) the output data to the device 110. In response, the device 110 may output (622) content corresponding to the output data. For example, if the output data includes text data including natural language text, the device 110 may display the natural language text. For further example, if the output data includes audio data including synthesized speech, the device 110 may output audio corresponding to the synthesized speech. In another example, if the output data includes the foregoing text data and audio data, the device 110 may display the foregoing natural language text and output the foregoing audio corresponding to the synthesized speech.

Before, while, or after the device 110 outputs the content, the recommendation skill 225b may send (624), to the content skill 225a, a directive to execute the first NLU intent represented in the NLU output data received by the content skill 225a at step 510. In response to receiving the directive, the content skill 225a may execute (626) the first NLU intent to generate output data. For example, if the first NLU intent is a <PlayMusic> intent, the content skill 225a may generate output audio data corresponding to a song. For further example, if the first NLU intent is a <PlayNews> intent, the content skill 225a may generate output audio data corresponding to a news segment. In another example, if the first NLU intent is a <PlayPodcast> intent, the content skill 225a may generate output audio data corresponding to a podcast episode.

The content skill 225a may send (628) the output data to the device 110, and the device 110 may output (630) content corresponding to the output data. For example, if the device 110 receives output audio data, the device 110 may output audio.

Figure 7A:
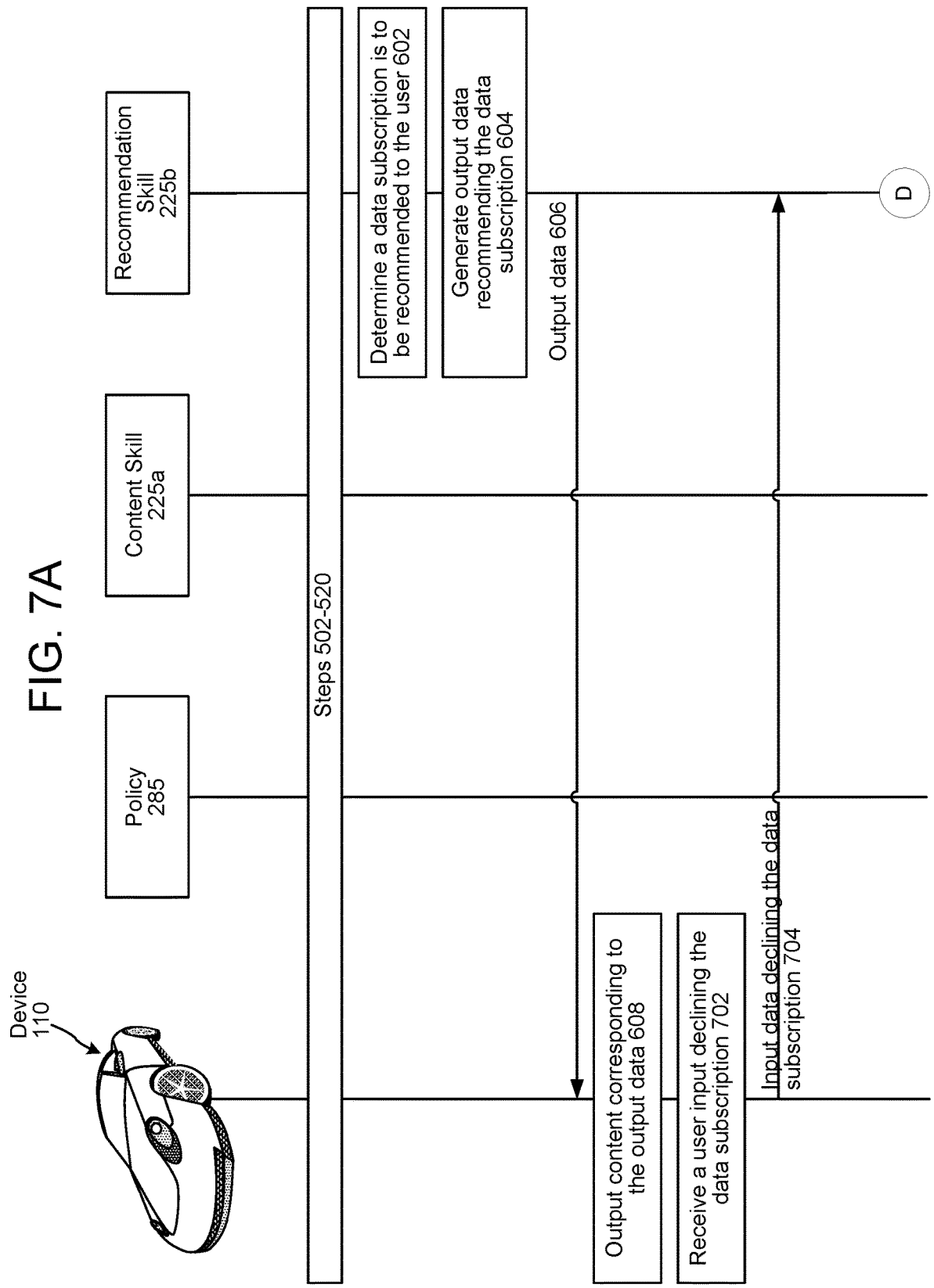

In at least some instances, rather than accept a recommended data subscription as described above, the user 5 may decline the recommended data subscription. The following describes, and FIGS. 7A-7B illustrate, the processing that may be performed when the speech processing system 120 recommends and the user 5 declines a data subscription. As illustrated in FIG. 7A, steps 502-520 may be performed. After such, the recommendation skill 225b may determine (602) a data subscription (e.g., a free trial or paid subscription) is to be recommended to the user 5. As described above, the recommendation skill 225b may make such determination based on various data, including but not limited to the first NLU intent represented in the NLU output data representing the instant user input, the domain represented in the NLU output data, and/or a number of user inputs between the instant user input and a most recent instance a data subscription was recommended to the user 5.

Based on determining the data subscription is to be recommended, the recommendation skill 225b may generate (604) the output data recommending the data subscription, and may send (606) the output data to the device 110. In response, the device 110 may output (608) the content corresponding to the output data.

After outputting the content, the device 110 may receive (610) a user input declining the data subscription. For example, the device 110 may receive audio corresponding to a spoken natural language user input declining the recommended data subscription. In another example, the device 110 may receive a typed natural language user input declining the recommended data subscription. For further example, the device 110 may include or be in communication with a camera(s) that captures a sequence of images representing the user 5 performing a gesture declining the recommended data subscription (e.g., a thumbs down, the shaking of the user's head, etc.). In another example, the device 110 may display a button indicating declination of the recommended data subscription, and the device 110 may detect the user 5 interacting with the button.

The device 110 may send (704), to the recommendation skill 225b, input data representing the user input declining the recommended data subscription. For example, the input data may be audio data when the device 110 receives a spoken natural language user input. In another example, the input data may be text data when the device 110 receives a typed natural language user input. For further example, the input data may be image data when the device 110 receives a sequence of images representing the user 5 performing a gesture. Or the device 110 may process the sequence of images to determine the gesture, and may send an indication of the gesture to the speech processing system 120. In another example, when the device 110 detects the user 5 interacting with a button, the device 110 may send input data (representing the button interaction) to the speech processing system 120.

After receiving the input data, the recommendation skill 225b may determine (706) the input data declines the recommended data subscription. For example, if the recommendation skill 225b receives audio data from the device 110, the recommendation skill 225b may send the input data to the ASR component 250, the ASR component 250 may perform ASR processing on the audio data to generate ASR output data, the NLU component 260 may perform NLU processing on the ASR output data to generate NLU output data indicating the user input declines the recommended data subscription, and the NLU output data may be sent to the recommendation skill 225b. Alternatively, the recommendation skill 225b may send the audio data to the SLU component 240, and the SLU component 240 may perform SLU processing on the audio data to generate the NLU output data. In another example, if the recommendation skill 225b receives text data from the device 110, the recommendation skill 225b may send the text data to the NLU component 260, and the NLU component 260 may perform NLU processing on the text data to generate the NLU output data. For further example, if the recommendation skill 225b receives image data from the device 110, the recommendation skill 225b may send the image data to a computer vision component of the speech processing system 120, and the computer vision component may perform computer vision processing on the image data to determine the user-performed gesture, determine the gesture indicates declination of the recommended data subscription, and send data indicating the declination to the recommendation skill 225b. In another example, if the recommendation skill 225b receives data representing a performed gesture, the recommendation skill 225b may send the data to the computer vision component, and the computer vision component may determine the gesture indicates declination of the recommended data subscription, and send data indicating the declination to the recommendation skill 225b. For further example, if the recommendation skill 225b receives data representing a button interaction, the recommendation skill 225b may determine the button interaction indicates declination of the recommended data subscription.

After determining the input data declines the data subscription, steps 524-542, described herein above, may be performed.

Figure 8:
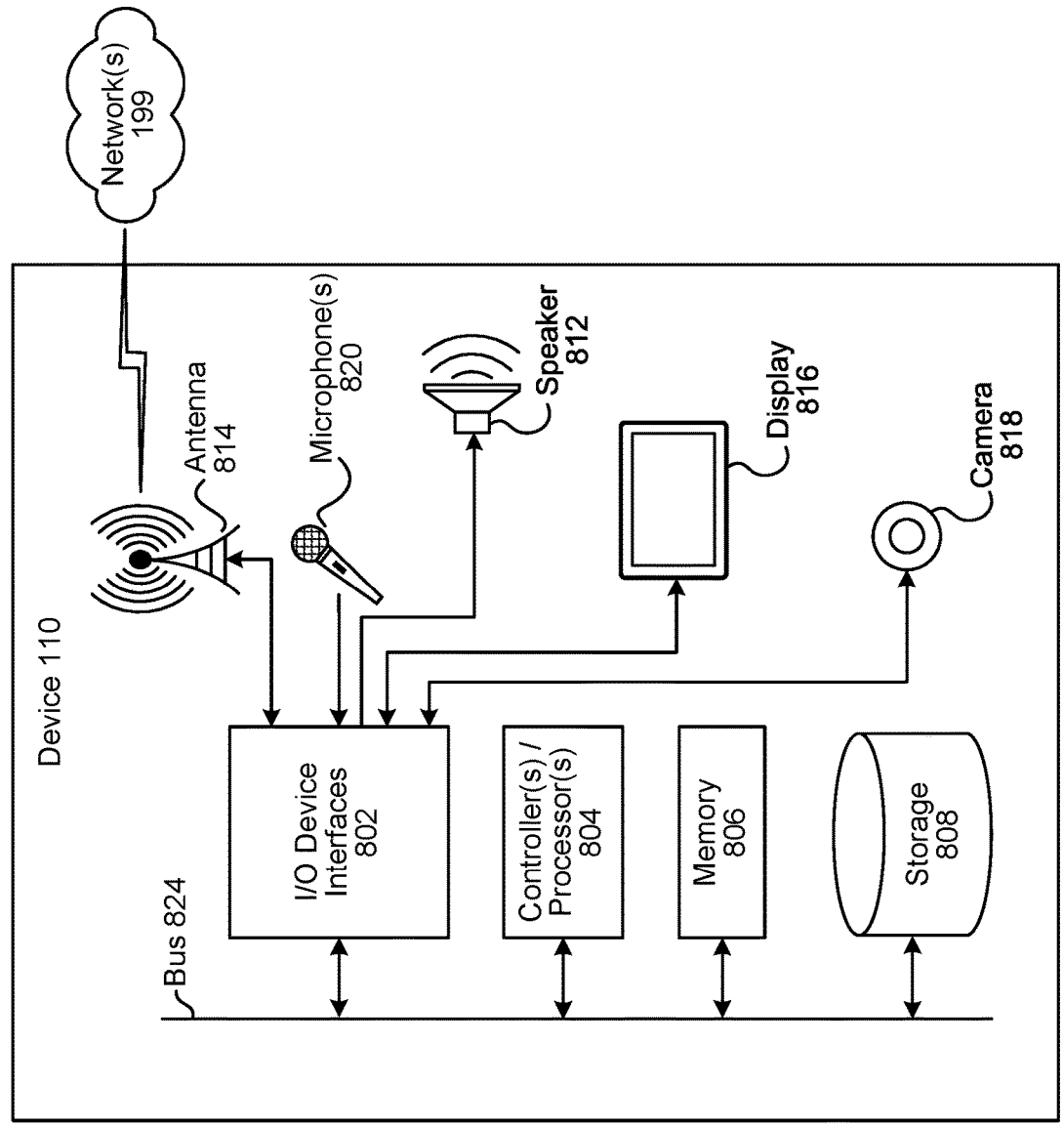
FIG. 8 is a block diagram conceptually illustrating example components of a device, according to embodiments of the present disclosure.
Figure 9:
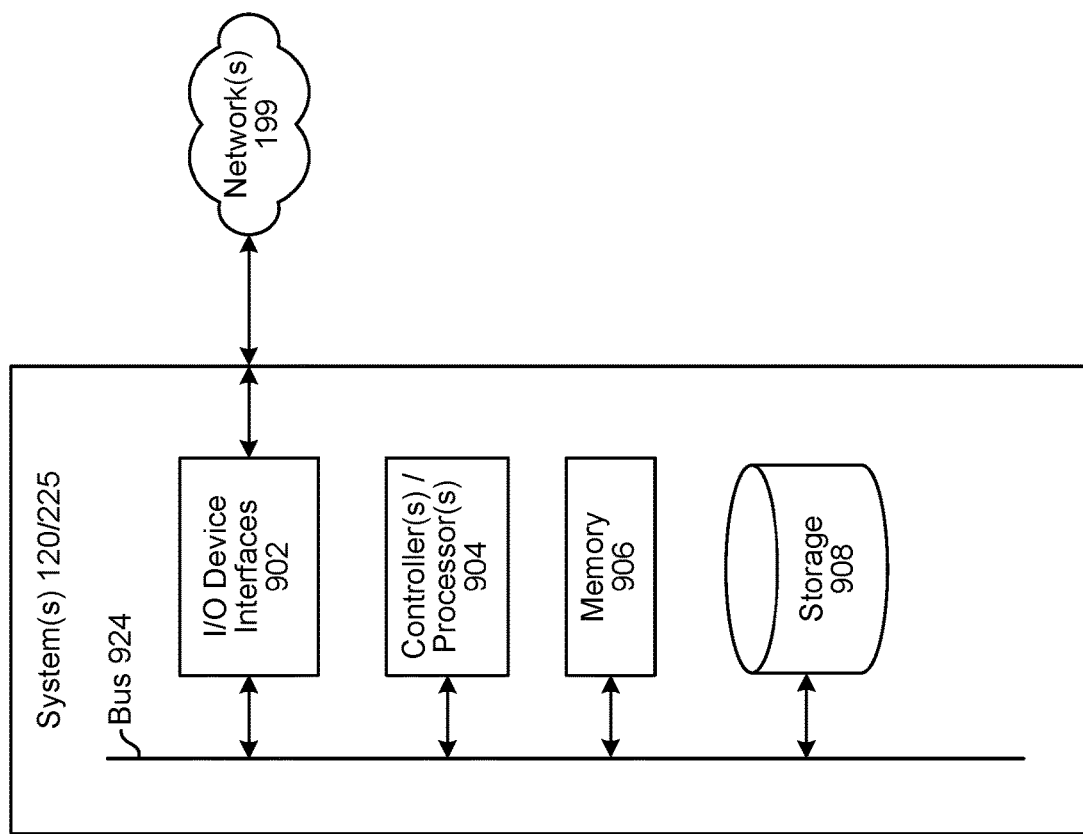
FIG. 9 is a block diagram conceptually illustrating example components of a system, according to embodiments of the present disclosure.

FIG. 8 is a block diagram conceptually illustrating a device 110 that may be used with the system 120. FIG. 9 is a block diagram conceptually illustrating example components of a remote device, such as the speech processing system 120 or a skill 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/225) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the system 100 of the present disclosure, such as one or more systems 120 for performing ASR processing, one or more systems 120 for performing NLU processing, one or more skill 225, one or more skills 225, etc. In operation, each of these systems may include computer-readable and computer-executable instructions that reside on the respective device (120/225), as will be discussed further below.

Each of these devices (110/120/225) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/225) may also include a data storage component (808/908) for storing data and controller/processor-executable instructions. Each data storage component (808/908) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (802/902).

Computer instructions for operating each device (110/120/225) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/225) includes input/output device interfaces (802/902). A variety of components may be connected through the input/output device interfaces (802/902), as will be discussed further below. Additionally, each device (110/120/225) may include an address/data bus (824/924) for conveying data among components of the respective device. Each component within a device (110/120/225) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content. The device 110 may further include a camera 818.

Via antenna(s) 814, the input/output device interfaces 802 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device 110, the system 120, and/or the skill 225 may include their own dedicated processors, memory, and/or storage. Alternatively, one or more of the components of the device 110, the system 120, and/or the skill 225 may utilize the I/O interfaces (802/902), processor(s) (804/904), memory (806/906), and/or storage (808/908) of the device 110, the system 120, or the skill 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and the skill 225, as described herein, are illustrative, and may be located as a stand-alone device or may be included, in whole or in part, as a component of a larger device or system.

Figure 10:
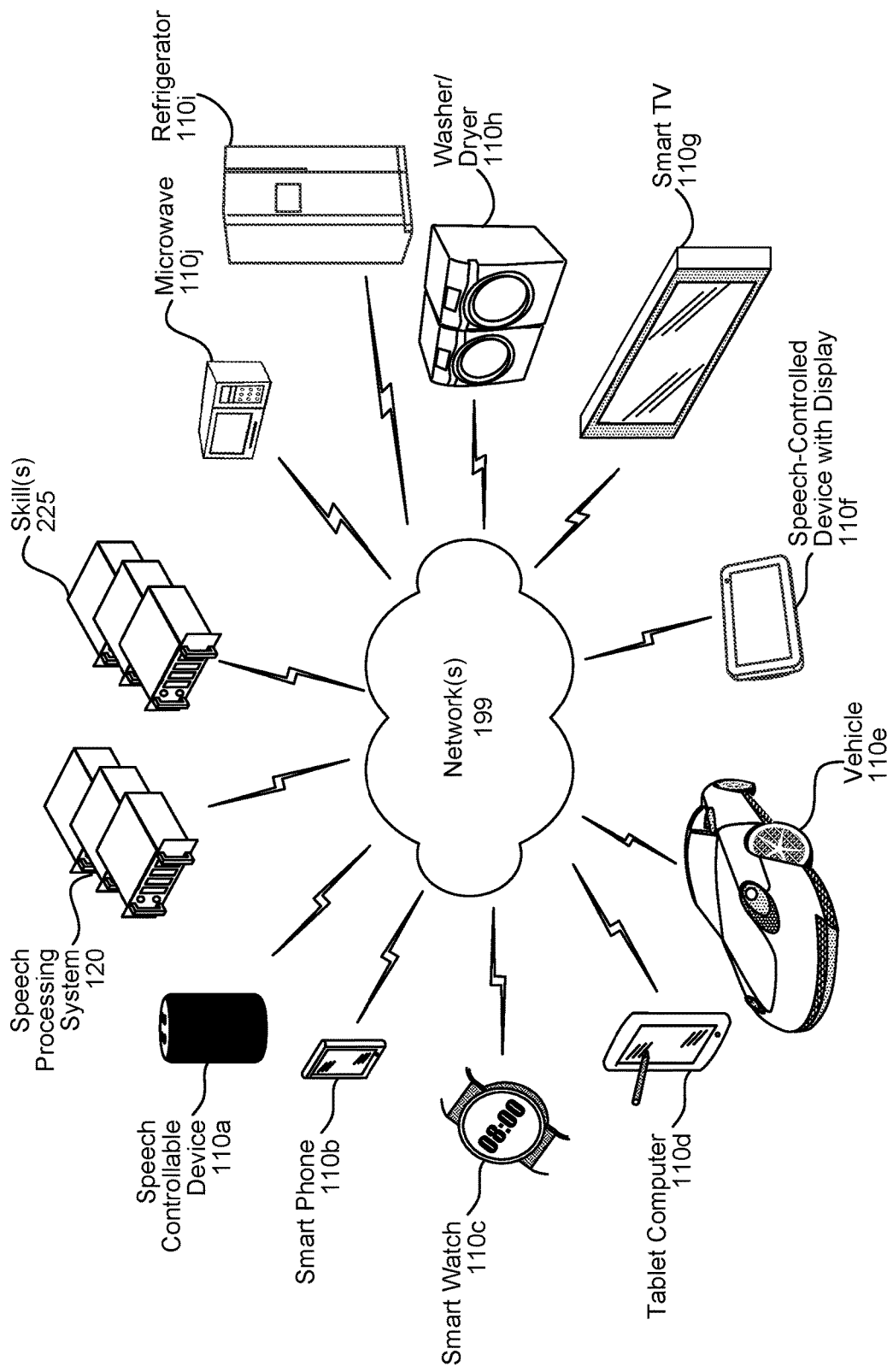
FIG. 10 illustrates an example of a computer network for use with the overall system, according to embodiments of the present disclosure.

As illustrated in FIG. 10, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110a, a smart phone 110b, a smart watch 110c, a tablet computer 110d, a vehicle 110e, a speech-controllable display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system 120, the skill 225, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    receiving, from a first device corresponding to a device type, first input audio data representing a first spoken natural language user input;
    performing speech processing using the first input audio data to determine the first spoken natural language user input corresponds to a first natural language understanding (NLU) intent that results in a first content type being output;
    based at least in part on the first device corresponding to the device type, determining execution of the first NLU intent requires a data subscription;
    determining profile data associated with the first device;
    determining the profile data lacks an indication that the data subscription is active;
    determining a second NLU intent that results in output of the first content type, wherein the second NLU intent is unassociated with the data subscription;
    performing speech synthesis processing to generate first output audio data indicating the second NLU intent is an alternative to the first NLU intent;
    causing the first device to output the first output audio data; and
    perform processing corresponding to the second NLU intent.

2. The computer-implemented method of claim 1, further comprising:
    determining the first device includes a processing component configured to output the first content type; and
    perform the processing corresponding to the second NLU intent based at least in part on:
        execution of both the first NLU intent and the second NLU intent including outputting the first content type; and
        the first device including the processing component.

3. The computer-implemented method of claim 1, further comprising:
    receiving, from the first device, second input audio data representing a second spoken natural language user input;
    performing speech processing using the second input audio data to determine the second spoken natural language user input corresponds to the first NLU intent;
    determining the first device includes an input/output interface capable of communicating with a second device configured to perform processing corresponding to the first NLU intent;
    performing speech synthesis processing to generate second output audio data indicating the first device includes the input/output interface; and
    sending the second output audio data to the first device for output.

4. A computer-implemented method comprising:
    receiving, from a first device, first input data representing a first natural language user input;
    determining the first natural language user input corresponds to a first natural language understanding (NLU) intent, wherein execution of the first NLU intent includes outputting a first content type;
    determining authorization is required to execute the first NLU intent;
    based at least in part on determining the authorization is required, determining a second NLU intent to be executed instead of the first NLU intent, wherein execution of the second NLU intent includes outputting the first content type;
    generating first output data indicating the second NLU intent is an alternative to the first NLU intent;
    causing the first device to output the first output data; and
    performing processing corresponding to the second NLU intent.

5. The computer-implemented method of claim 4, further comprising:
    determining the authorization is required based at least in part on determining execution of the first NLU intent requires a subscription;
    determining profile data associated with the first device;
    determining the profile data lacks an indication that the subscription is active; and
    determining the second NLU intent is to be executed further based at least in part on the profile data lacking the indication.

6. The computer-implemented method of claim 4, further comprising:
    determining a device type corresponding to the first device; and
    determining the second NLU intent is to be executed further based at least in part on the device type.

7. The computer-implemented method of claim 4, further comprising:
    determining the second NLU intent is to be executed further based at least in part on execution of both the first NLU intent and the second NLU intent including outputting the first content type.

8. The computer-implemented method of claim 4, further comprising:
    receiving, from the first device, second input data representing a second natural language user input;
    determining the second natural language user input corresponds to the first NLU intent;

determining the first device includes an input/output interface capable of communicating with a second device configured to execute the first NLU intent;
generating second output data indicating the first device includes the input/output interface; and
causing the first device to output the second output data.

9. The computer-implemented method of claim 4, further comprising:
generating first NLU output data representing the first natural language user input, the first NLU output data including the first NLU intent;
generating first data representing the authorization is required to perform the first NLU intent; and
sending, to a processing component configured to execute the first NLU intent, the first NLU output data and the first data.

10. The computer-implemented method of claim 4, further comprising:
determining the first input data is associated with a user identifier;
determining the user identifier is associated with a user type; and
determining the authorization is required based at least in part on the user type.

11. The computer-implemented method of claim 4, further comprising:
sending, to a processing component, first data requesting whether the authorization is required to execute the first NLU intent;
receiving, from the processing component, second data indicating the authorization is required; and
determining the second NLU intent is to be executed further based at least in part on the second data.

12. The computer-implemented method of claim 4, further comprising:
sending, to a processing component, first data requesting whether a subscription is to be recommended;
receiving, from the processing component, second data indicating the subscription is not to be recommended; and
determining the second NLU intent further based at least in part on receiving the second data.

13. A computing system comprising:
at least one processor; and
at least one memory comprising instructions that, when executed by the at least one processor, cause the computing system to:
receive, from a first device, first input data representing a first natural language user input;
determine the first natural language user input corresponds to a first natural language understanding (NLU) intent, wherein execution of the first NLU intent includes outputting a first content type;
determine authorization is required to execute the first NLU intent;
based at least in part on determining the authorization is required, determine a second NLU intent to be executed instead of the first NLU intent, wherein execution of the second NLU intent includes outputting the first content type;
generate first output data indicating the second NLU intent is an alternative to the first NLU intent;
cause the first device to output the first output data; and
perform processing corresponding to the second NLU intent.

14. The computing system of claim 13, wherein the at least one memory further comprises instructions that, when executed by the at least one processor, further cause the computing system to:
determine the authorization is required based at least in part on determining execution of the first NLU intent requires a subscription;
determine profile data associated with the first device;
determine the profile data lacks an indication that the subscription is active; and
determine the second NLU intent is to be executed further based at least in part on the profile data lacking the indication.

15. The computing system of claim 13, wherein the at least one memory further comprises instructions that, when executed by the at least one processor, further cause the computing system to:
determine a device type corresponding to the first device; and
determine the second NLU intent is to be executed further based at least in part on the device type.

16. The computing system of claim 13, wherein the at least one memory further comprises instructions that, when executed by the at least one processor, further cause the computing system to:
determine the second NLU intent is to be executed further based at least in part on execution of both the first NLU intent and the second NLU intent including outputting the first content type.

17. The computing system of claim 13, wherein the at least one memory further comprises instructions that, when executed by the at least one processor, further cause the computing system to:
receive, from the first device, second input data representing a second natural language user input;
determine the second natural language user input corresponds to the first NLU intent;
determine the first device includes an input/output interface capable of communicating with a second device configured to execute the first NLU intent;
generate second output data indicating the first device includes the input/output interface; and
cause the first device to output the second output data.

18. The computing system of claim 13, wherein the at least one memory further comprises instructions that, when executed by the at least one processor, further cause the computing system to:
generate first NLU output data representing the first natural language user input, the first NLU output data including the first NLU intent;
generate first data representing authorization credentials are required to perform the first NLU intent; and
send, to a processing component configured to execute the first NLU intent, the first NLU output data and the first data.

19. The computing system of claim 13, wherein the at least one memory further comprises instructions that, when executed by the at least one processor, further cause the computing system to:
determine the first input data is associated with a user identifier;
determine the user identifier is associated with a user type; and
determine the authorization is required based at least in part on the user type.

20. The computing system of claim 13, wherein the at least one memory further comprises instructions that, when executed by the at least one processor, further cause the computing system to:
- send, to a processing component, first data requesting whether the authorization is required to execute the first NLU intent;
- receive, from the processing component, second data indicating the authorization is required; and
- determine the second NLU intent is to be executed further based at least in part on the second data.

* * * * *